(12) United States Patent
Nomura

(10) Patent No.: US 7,229,223 B2
(45) Date of Patent: Jun. 12, 2007

(54) ROTATION TRANSFER MECHANISM AND A ZOOM CAMERA INCORPORATING THE ROTATION TRANSFER MECHANISM

(75) Inventor: Hiroshi Nomura, Saitama (JP)

(73) Assignee: PENTAX Corporation, Tokyo (JP)

( * ) Notice: Subject to any disclaimer, the term of this patent is extended or adjusted under 35 U.S.C. 154(b) by 79 days.

(21) Appl. No.: 10/959,046

(22) Filed: Oct. 7, 2004

(65) Prior Publication Data
US 2005/0169621 A1 Aug. 4, 2005

(30) Foreign Application Priority Data
Feb. 3, 2004 (JP) .............................. 2004-027203

(51) Int. Cl.
- G03B 5/02 (2006.01)
- G03B 13/10 (2006.01)
- G03B 17/04 (2006.01)

(52) U.S. Cl. ...................................... 396/349; 396/379

(58) Field of Classification Search .................. 396/72, 396/79, 85, 133, 144, 148, 175, 349, 379; 359/819, 826
See application file for complete search history.

(56) References Cited

U.S. PATENT DOCUMENTS

| | | | |
|---|---|---|---|
| 3,377,427 A | 4/1968 | Fischer | |
| 4,451,129 A | 5/1984 | Ikari et al. | |
| 4,525,050 A | 6/1985 | Ohashi | |
| 4,545,661 A | 10/1985 | Hamaguchi et al. | |
| 4,597,657 A | 7/1986 | Wakabayashi et al. | |
| 4,643,554 A | 2/1987 | Ogawa | |
| 4,643,555 A | 2/1987 | Wakabayashi | |
| 4,721,972 A | 1/1988 | Wakabayashi | |
| 4,768,048 A | 8/1988 | Wakabayashi | ............... 396/75 |
| 4,771,303 A | 9/1988 | Matsumoto et al. | |
| 4,791,441 A | 12/1988 | Nishi | |
| 4,792,822 A | 12/1988 | Akiyama et al. | |
| 4,841,323 A | 6/1989 | Minoru et al. | ................. 396/90 |
| 4,887,107 A | 12/1989 | Nakamure et al. | |
| 4,937,609 A | 6/1990 | Wakabayashi et al. | |
| 4,952,955 A | 8/1990 | Iwata et al. | |
| 4,974,949 A | 12/1990 | Tanaka | |
| 4,993,815 A | 2/1991 | Yamazali et al. | |
| 5,086,312 A | 2/1992 | Tanaka et al. | |

(Continued)

FOREIGN PATENT DOCUMENTS

DE 3317999 11/1983

(Continued)

OTHER PUBLICATIONS

English Language Abstract of JP 2000-023002.

(Continued)

Primary Examiner—W. B. Perkey
Assistant Examiner—Rishi S. Suthar
(74) Attorney, Agent, or Firm—Greenblum & Bernstein, P.L.C.

(57) ABSTRACT

A rotation transfer mechanism includes a rotatable ring and has a circumferential gear formed on a peripheral surface of the rotatable ring, and a rotation transfer gear, wherein rotation of the rotatable ring is transferred to the rotation transfer gear via engagement of the circumferential gear with the rotation transfer gear while the rotatable ring and the rotation transfer gear move relative to each other throughout the entire relative movement range of the rotatable ring and the rotation transfer gear shaft. The rotation transfer gear includes a gear portion engaged with the circumferential gear to transfer the rotation of the rotatable ring to the rotation transfer gear, and a rotation limit portion having a non-circular cross-section engageable with an outer edge of the circumferential gear to prohibit the rotation transfer gear from rotating.

23 Claims, 26 Drawing Sheets

U.S. PATENT DOCUMENTS

| | | | |
|---|---|---|---|
| 5,099,263 A | 3/1992 | Matsumoto et al. | |
| 5,136,324 A | 8/1992 | Tsuboi et al. | |
| 5,210,644 A | 5/1993 | Nomura | |
| 5,223,873 A | 6/1993 | Tsuboi | |
| 5,264,939 A | 11/1993 | Chang | 348/322 |
| 5,376,983 A | 12/1994 | Yamazaki et al. | |
| 5,430,516 A | 7/1995 | Uziie et al. | |
| 5,485,315 A | 1/1996 | Nomura et al. | |
| 5,499,143 A | 3/1996 | Sakamoyo et al. | |
| 5,548,446 A | 8/1996 | Enomoto | |
| 5,587,754 A | 12/1996 | Katyama et al. | |
| 5,636,062 A | 6/1997 | Okuyama et al. | |
| 5,715,482 A | 2/1998 | Wakabayashi et al. | 396/79 |
| 5,731,913 A | 3/1998 | Imanari | |
| 5,739,962 A | 4/1998 | Asakura et al. | |
| 5,765,049 A | 6/1998 | Hase et al. | |
| 5,790,907 A | 8/1998 | Reibl | |
| 5,790,911 A | 8/1998 | Reibl | |
| 5,818,647 A | 10/1998 | Nishio et al. | |
| 5,832,326 A | 11/1998 | Tanaka | |
| 5,870,232 A | 2/1999 | Tsuji et al. | |
| 5,909,600 A | 6/1999 | Kosako | |
| 5,912,772 A | 6/1999 | Aoki | |
| 5,926,322 A | 7/1999 | Iwasaki | |
| 6,031,998 A | 2/2000 | Shono | |
| 6,052,535 A | 4/2000 | Uno | |
| 6,055,116 A | 4/2000 | Nomura et al. | |
| 6,064,533 A | 5/2000 | Kenin et al. | |
| 6,069,745 A | 5/2000 | Fujii et al. | |
| 6,075,655 A | 6/2000 | Funahashi et al. | |
| 6,115,190 A | 9/2000 | Hirai | |
| 6,185,375 B1 | 2/2001 | Mikami | 396/84 |
| 6,204,977 B1 | 3/2001 | Iwasa | |
| 6,324,019 B1 | 11/2001 | Takanashi et al. | |
| 6,366,323 B1 | 4/2002 | Shono | |
| 6,490,099 B2 | 12/2002 | Sasaki | |
| 6,570,718 B2 | 5/2003 | Nomura et al. | |
| 6,611,663 B2 | 8/2003 | Nakagawa | |
| 6,665,129 B2 | 12/2003 | Nomura et al. | |
| 6,711,349 B1 | 3/2004 | DiRisio | |
| 6,757,489 B2 | 6/2004 | Nomura et al. | |
| 2001/0017738 A1 | 8/2001 | Nomura et al. | |
| 2001/0019458 A1 | 9/2001 | Nomura et al. | |
| 2001/0024573 A1 | 9/2001 | Nomura et al. | |
| 2002/0135896 A1 | 9/2002 | Nomura et al. | |
| 2002/0135900 A1* | 9/2002 | Nomura et al. | 359/819 |
| 2002/0135901 A1 | 9/2002 | Nomura et al. | |
| 2002/0181953 A1 | 12/2002 | Ichinokawa | |
| 2003/0007796 A1 | 1/2003 | Nomura et al. | |
| 2003/0081325 A1 | 5/2003 | Nomura et al. | |
| 2003/0081327 A1 | 5/2003 | Nomura et al. | |
| 2003/0081948 A1 | 5/2003 | Nomura et al. | |
| 2003/0156832 A1 | 8/2003 | Nomura et al. | |
| 2004/0042089 A1 | 3/2004 | Nomura | |
| 2004/0042090 A1 | 3/2004 | Nomura | |
| 2004/0042091 A1 | 3/2004 | Nomura | |
| 2004/0042092 A1 | 3/2004 | Nomura | 359/819 |
| 2004/0042093 A1 | 3/2004 | Nomura | |
| 2004/0042095 A1 | 3/2004 | Nomura | |
| 2004/0042096 A1 | 3/2004 | Nomura | |
| 2004/0042775 A1 | 3/2004 | Nomura | |
| 2004/0042776 A1 | 3/2004 | Nomura | 396/73 |
| 2004/0042777 A1 | 3/2004 | Nomura | |
| 2004/0042778 A1 | 3/2004 | Nomura | |
| 2004/0051967 A1 | 3/2004 | Nomura | |
| 2004/0051968 A1 | 3/2004 | Nomura | |
| 2004/0051969 A1 | 3/2004 | Nomura | |
| 2004/0051970 A1 | 3/2004 | Nomura | |
| 2004/0051971 A1 | 3/2004 | Nomura | |
| 2004/0051972 A1 | 3/2004 | Nomura | |
| 2004/0051981 A1 | 3/2004 | Nomura | |
| 2004/0062536 A1 | 4/2004 | Nomura | 396/72 |
| 2004/0062537 A1 | 4/2004 | Nomura | |
| 2004/0076418 A1 | 4/2004 | Nomura | |
| 2004/0091253 A1 | 5/2004 | Nomura | |
| 2004/0141735 A1 | 7/2004 | Nomura | 396/72 |
| 2004/0141736 A1 | 7/2004 | Nomura | |
| 2004/0141737 A1 | 7/2004 | Nomura | |
| 2004/0151490 A1 | 8/2004 | Nomura | |

FOREIGN PATENT DOCUMENTS

| | | |
|---|---|---|
| DE | 19623066 | 12/1997 |
| EP | 0598703 | 5/1994 |
| EP | 0634680 | 1/1995 |
| EP | 0810466 | 3/1997 |
| GB | 2261298 | 5/1993 |
| GB | 2262356 | 6/1993 |
| GB | 2309551 | 7/1997 |
| GB | 2344661 | 6/2000 |
| GB | 2344662 | 6/2000 |
| GB | 2394787 | 5/2004 |
| JP | 58-10708 | 1/1982 |
| JP | 58-145930 | 8/1983 |
| JP | 58-162914 | 9/1983 |
| JP | 61-69002 | 4/1986 |
| JP | 61-133933 | 6/1986 |
| JP | 61-270737 | 12/1986 |
| JP | 63-149629 | 6/1988 |
| JP | 64-34623 | 3/1989 |
| JP | 5-313226 | 11/1993 |
| JP | 6-18777 | 1/1994 |
| JP | 6-230263 | 8/1994 |
| JP | 6-308592 | 11/1994 |
| JP | 7-191249 | 7/1995 |
| JP | 7-199019 | 8/1995 |
| JP | 7-288724 | 10/1995 |
| JP | 7-295050 | 11/1995 |
| JP | 8-313790 | 11/1996 |
| JP | 9-005849 | 1/1997 |
| JP | 9-15682 | 1/1997 |
| JP | 10-32740 | 2/1998 |
| JP | 10-254054 | 9/1998 |
| JP | 10-282394 | 10/1998 |
| JP | 11-109203 | 4/1999 |
| JP | 2000-023002 | 1/2000 |
| JP | 2002-277719 | 9/2002 |
| JP | 2003/114473 | 4/2003 |
| JP | 2003-149723 | 5/2003 |
| JP | 2003-207709 | 7/2003 |
| JP | 2004-257555 | 9/2004 |

OTHER PUBLICATIONS

English Language Abstract of JP 6-308592.
English Language Abstract of JP 7-199019.
English Language Abstract of JP 5-313226.
English Language Abstract of JP7-295050.
English Language Abstract of JP 9-5849.
English Language Abstract of JP 61-133933.
English Language Abstract of JP 2003-114473.
English Language Abstract of JP2004-257555.
English Language Translation of JP 2000-23002, published Jan. 21, 2000.
English Language Translation of JP 6-308592, published Nov. 4, 1994.
English Language Translation of JP 7-199019, published Aug. 4, 1995.
English Language Translation of JP 5-313226, published Nov. 26, 1993.
English Language Translation of JP 7-295050, published Nov. 10, 1995.
English Language Translation of JP 9-5849, published Jan. 10, 1997.

English Language Translation of JP 2003-114473, published Apr. 18, 2003.
U.S. Appl. No. 10/646,724 to Nomura, filed Aug. 25, 2003.
English Language Abstract JP 58-10708.
English Language Abstract JP2003-207709.
English Language Abstract JP 2002-277719.
English Language Abstract JP10-282394.
English Language Abstract JP58-162914.
English Language Abstract of JP 9-15682.
English Language Abstract of JP 2003-149723.
English Language Abstract of JP6-18777.
English Language Abstract of JP8-313790.
English Language Abstract of JP6-230263.
English Language Abstract of JP10-254054.
Pentax Press News,"Pentax Optio S", Feb. 4, 2003, togther with an English Language translation of the same.
Digital CAPA Mar. 2003, togther with an English Language translation of the same; and.
Pentax News Release, "A High-Qulity Zoom Lens Digital Camera so Small that it Fits into a Tin of Aitoids", Jan. 8, 2003.
U.S. Appl. No. 10/815,193 to Shono filed Apr. 1, 2004.
U.S. Appl. No. 10/815,194 to Shono filed Apr. 1, 2004.

* cited by examiner

ROTATION TRANSFER MECHANISM AND A ZOOM CAMERA INCORPORATING THE ROTATION TRANSFER MECHANISM

BACKGROUND OF THE INVENTION

1. Field of the Invention

The present invention relates to a rotation transfer mechanism for transferring a torque of a rotatable ring to a driven member, and also relates to a zoom camera (a zoom-lens-equipped camera) which incorporates such a rotation transfer mechanism.

2. Description of the Related Art

Zoom cameras having a zoom lens which incorporates a zoom viewfinder and/or a zoom flash that operates in association with a variation of the focal length of the photographing (imaging) optical system are known in the art. It is often the case that in such zoom cameras a rotatable ring which drives the photographing optical system also drives the zoom viewfinder and/or the zoom flash. Specifically, in a particular type of zoom camera in which the photographing optical system is not only driven in a zooming range (a range between wide-angle extremity and telephoto extremity) but also capable of being retracted, the zoom viewfinder and/or the zoom flash must be constructed so as not to be associated with the photographing optical system when the photographing optical system is in a state between a ready-to-photograph state and a fully-retracted state. Conventionally, to cancel the association of the photographing optical system with the zoom viewfinder and/or the zoom flash, a rotation transfer mechanism (drive transfer system) for transferring a torque of the rotatable ring to the zoom viewfinder and/or the zoom flash needs to be provided with an idle running section for disengaging the zoom viewfinder and/or the zoom flash from the rotatable ring.

However, it is desirable for the rotation transfer mechanism not to be provided with such an idle running section from the viewpoint of miniaturization of the zoom viewfinder and/or the zoom flash and the accuracy in driving the zoom viewfinder and/or the zoom flash. For instance, in the case where the rotation transfer mechanism includes a cam, the size of the cam increases if the cam is provided with the idle running section. In this case, even if the cam is provided with an idle running section without increasing the size of the cam, the shape of the remaining section of the cam is limited, which makes it difficult to obtain an ideal cam shape or contour. Similar problems arise not only in rotation transfer mechanisms of such zoom cameras but also in rotation transfer mechanisms of other devices. Accordingly, in consideration of miniaturization of the zoom viewfinder and/or the zoom flash and the accuracy in driving the zoom viewfinder and/or the zoom flash, it is desirable that an idle running section such as described above be as small as possible, in which a rotatable ring and a driven member are made to be associated with each other when the rotatable ring is positioned in a predetermined range of rotation thereof relative to the driven member, and in which the rotatable ring and the driven member are made not to be associated with each other when the rotatable ring is positioned outside the predetermined range of rotation thereof relative to the driven member.

SUMMARY OF THE INVENTION

The present invention provides a rotation transfer mechanism for transferring a torque of a rotatable ring to a driven member, wherein rotation of the rotatable ring is transferred to the driven member only when the rotatable ring is positioned in a predetermined range of rotation thereof relative to the driven member, and wherein miniaturizing the rotation transfer mechanism and driving the rotation transfer mechanism with high accuracy can be both achieved. The present invention further provides a zoom camera which incorporates such a rotation transfer mechanism, wherein the photographing optical system is made to be associated with an associated optical system such as a zoom viewfinder optical system and/or a zoom flash optical system in a ready-to-photograph state of the zoom lens while the photographing optical system is prohibited from being associated with the associated optical system in a retracted state of the zoom lens, and wherein miniaturizing the rotation transfer mechanism can be achieved without deteriorating the accuracy in driving the associated optical system.

According to an aspect of the present invention, a rotation transfer mechanism is provided, including a rotatable ring which is configured to rotate about a first rotational axis and has a circumferential gear formed on a peripheral surface of the rotatable ring; a rotation transfer gear shaft which is configured to rotate about a second rotational axis which is parallel to the first rotational axis, the rotatable ring and the rotation transfer gear shaft relatively moving in the first rotational axis direction while rotating; a gear portion which is provided on the rotation transfer gear shaft and is engaged with the circumferential gear to transfer the rotation of the rotatable ring to the rotation transfer gear shaft, wherein an axial length of the gear portion is longer than an axial length of the circumferential gear so that the engagement between the gear portion and the circumferential gear is maintained while the rotatable ring and the rotation transfer gear shaft move relative to each other throughout the entire relative movement range of the rotatable ring and the rotation transfer gear shaft; and a rotation limit portion provided on the rotation transfer gear shaft, the rotation limit portion having a non-circular cross section which is engageable with an outer edge of the circumferential gear to prohibit the rotation transfer gear shaft from rotating, the gear portion and the rotation limit portion being located at different axial positions on the rotation transfer gear shaft along the second rotational axis.

According to this rotation transfer mechanism, wherein rotation of the rotatable ring is transferred to the driven member only when the rotatable ring is positioned in a predetermined range of rotation thereof relative to the driven member, miniaturizing the rotation transfer mechanism and driving the rotation transfer mechanism with high accuracy can be both achieved. Moreover, in a zoom camera which incorporates such a rotation transfer mechanism, wherein the photographing optical system is made to be associated with an associated optical system such as a zoom viewfinder optical system and/or a zoom flash optical system in a ready-to-photograph state of the zoom lens while the photographing optical system is prohibited from being associated with the associated optical system in a retracted state of the zoom lens, miniaturizing the rotation transfer mechanism can be achieved without deteriorating the accuracy in driving the associated optical system.

The axial length of the rotation limit portion can be shorter than the axial length of the gear portion.

It is desirable for the rotatable ring to be movable along the first rotational axis, and for the rotation transfer gear shaft to be immovable along the second rotational axis.

It is desirable for the rotatable ring to include a helicoid located on a peripheral surface of the rotatable ring on which the circumferential gear is located.

It is desirable for the rotation limit portion to include a flat surface portion including a straight line parallel to the second rotational axis of the rotation transfer gear shaft.

At least one of the gear portion and the rotation limit portion of the rotation transfer gear shaft can include at least two portions located at different positions on the rotation transfer gear shaft in a direction of the second rotational axis.

The rotation transfer mechanism can include at least one driven member which is drivable by a rotation of the rotation transfer gear shaft, and is linearly guided in a direction parallel to the second rotational axis, and a driving-direction converter configured to convert torque transferred from the rotation transfer gear shaft into linear movement of the driven member.

It is desirable for the driving-direction converter to include a cam-incorporated rotatable cylinder having a substantially cylindrical shape which is rotatable on a rotational axis extending parallel to the second rotational axis in accordance with the rotation of the rotation transfer gear shaft, at least one cam surface being formed on an outer peripheral surface of the cam-incorporated rotatable cylinder.

It is desirable for the rotation transfer mechanism to include a reduction gear train including a plurality of spur gears provided between the rotation transfer gear shaft and the driven member. The driven member can include at least two driven members which are both movable relative to each other while changing the distance therebetween when the rotation transfer gear shaft is rotated.

It is desirable for the circumferential gear of the rotatable ring to include a reduced gear-tooth which is first engaged with the gear portion of the rotation transfer gear shaft when the rotatable ring changes from a first state in which the circumferential gear faces the rotation limit portion of the rotation transfer gear shaft to a second state in which the circumferential gear commences engagement with the gear portion of the rotation transfer gear shaft, a tooth depth of the reduced gear-tooth being smaller than those of other gear teeth of the gear portion of the rotation transfer gear shaft.

It is desirable for the rotation transfer mechanism to be incorporated in a camera having a zoom lens, and for the zoom lens to include an imaging optical system including a plurality of movable optical elements which move along an optical axis of the imaging optical system by a rotation of the rotatable ring.

It is desirable for the camera to include a zoom viewfinder associated with the imaging optical system, and at least one optical element of the zoom finder is moved in a direction parallel to the second rotational axis by a rotation of the rotation transfer gear shaft.

It is desirable for the camera to include a zoom flash associated with the imaging optical system, and at least one optical element of the zoom flash is moved in a direction parallel to the second rotational axis by a rotation of the rotation transfer gear shaft.

In another embodiment, a camera is provided, having a variable-focal-length imaging optical system and a driven optical system driven in association with a focal-length varying operation of the variable-focal-length imaging optical system, the variable-focal-length imaging optical system being changeable between an operating state in which the variable-focal-length imaging optical system performs the focal-length varying operation and a non-operating state in which the variable-focal-length imaging optical system retracts. The camera includes a rotatable drive ring including a circumferential gear on an outer peripheral surface of the rotatable drive ring, and configured to perform an advancing/retracting operation in which the rotatable drive ring moves along a first rotational axis while rotating thereabout during a focal-length varying operation of the variable-focal-length imaging optical system, and a drive gear shaft rotatable about a second rotational axis parallel to the first rotational axis, the driven optical system being driven by a rotation of the drive gear shaft. The drive gear shaft includes a gear portion which is engaged with the circumferential gear to transfer the rotation of the rotatable drive ring to the drive gear shaft, an axial length of the gear portion being greater than an axial length of the circumferential gear; and a rotation limit portion having a non-circular cross section which is engageable with an outer edge of the circumferential gear to prohibit the drive gear shaft from rotating, the gear portion and the rotation limit portion being located at different axial positions on the drive gear shaft. The drive gear shaft and the rotatable drive ring are positioned relative to each other such that the circumferential gear and the gear portion are engaged with each other when the rotatable drive ring is positioned in a first axial movement range thereof on the first rotational axis in which the rotatable drive ring makes the focal-length imaging optical system perform the focal-length varying operation. The drive gear shaft and the rotatable drive ring are positioned relative to each other such that the rotation limit portion faces the circumferential gear to be engageable with the outer edge of the circumferential gear when the rotatable drive ring is positioned in a second axial movement range thereof on the first rotation axis in which the rotatable drive ring makes the focal-length imaging optical system change between a ready-to-photograph state and a retracted state.

It is desirable for the rotation limit portion to include at least two rotation limit portions, wherein the gear portion includes at least two gear portions, and the two rotation limit portions and the two gear portions are alternately arranged along the second rotational axis.

It is desirable for the first rotational axis and the second rotational axis to be parallel to an optical axis of the variable-focal-length imaging optical system.

It is desirable for the driven optical system to include an optical system of a zoom viewfinder incorporated in the camera.

The driven optical system can be an optical system of a zoom flash incorporated in the camera.

It is desirable for the circumferential gear of the rotatable drive ring to include a reduced gear-tooth which is first engaged with the gear portion of the drive gear shaft when the rotatable drive ring changes from a first state in which the circumferential gear faces the rotation limit portion of the drive gear shaft to a second state in which the circumferential gear commences engagement with the gear portion of the drive gear, a tooth depth of the reduced gear-tooth being smaller than those of other gear teeth of the gear portion of the drive gear.

It is desirable for the helicoid to be formed on an outer peripheral surface of the rotatable ring to serve as a male helicoid, and for the circumferential gear to be formed on threads of the male helicoid so that each tooth of the circumferential gear extends in a direction parallel to both the first rotational axis and the second rotational axis.

It is desirable for the rotation limit portion to have a substantially D-shaped cross section.

The present disclosure relates to subject matter contained in Japanese Patent Application No. 2004-27203 (filed on Feb. 3, 2004) which is expressly incorporated herein in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
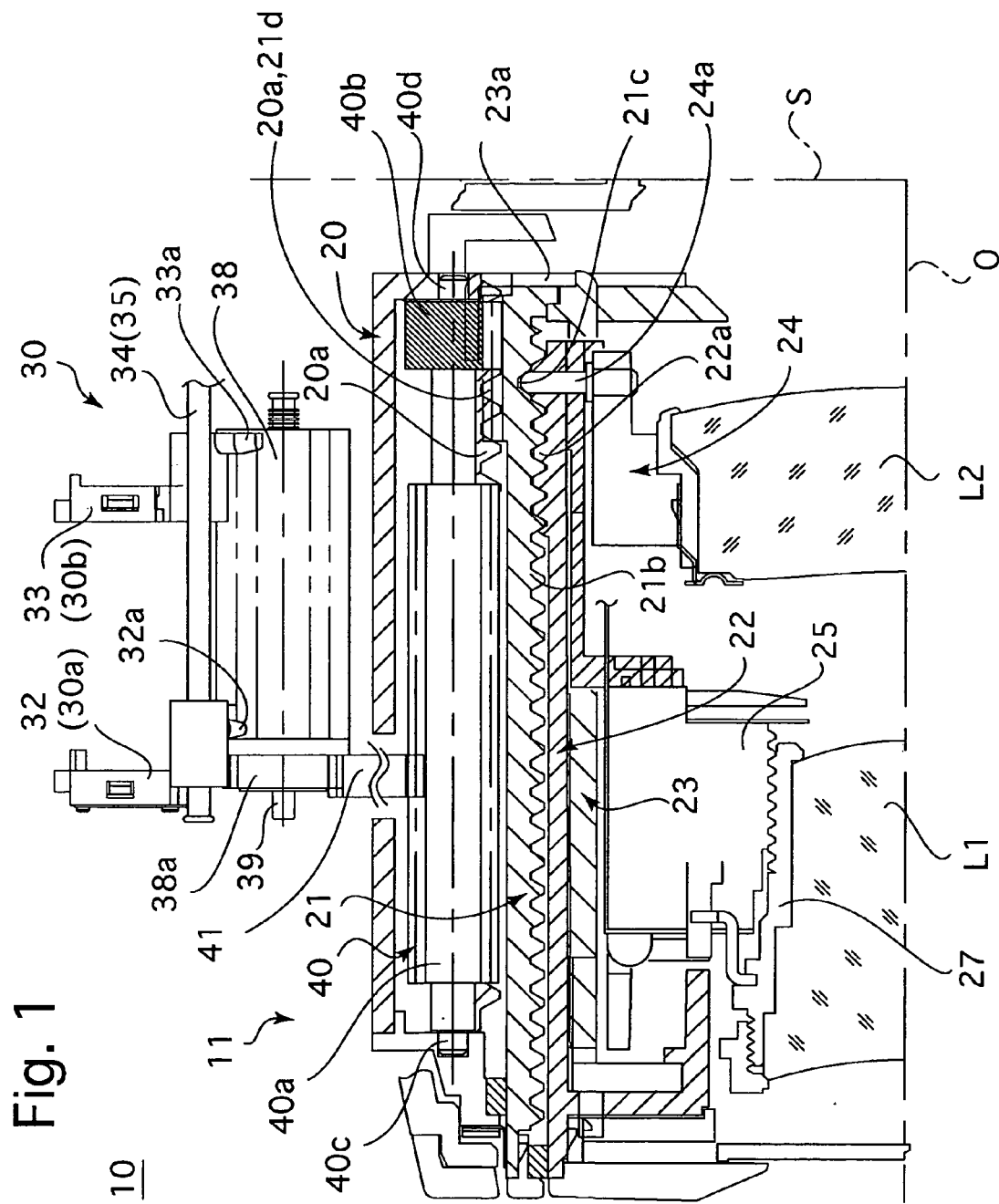
FIG. 1 is a longitudinal cross sectional view of a portion of an embodiment of a zoom camera having a rotation transfer mechanism according to the present invention, showing a zoom viewfinder of the zoom camera and an upper half of a zoom lens of the zoom camera from the optical axis thereof in a retracted state of the zoom lens.
Figure 2:
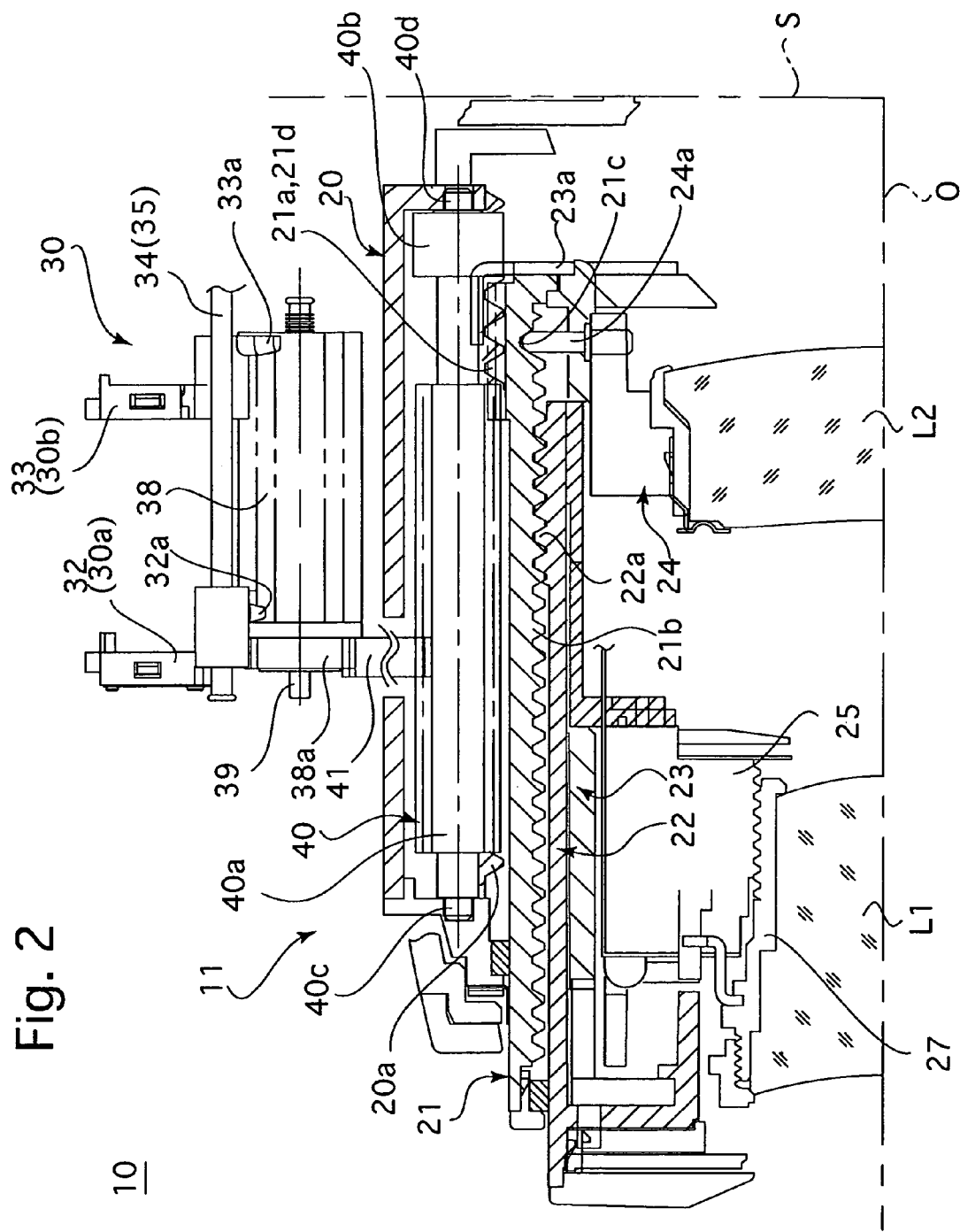
FIG. 2 is a view similar to that of FIG. 1, showing a state of the zoom lens at wide-angle extremity.
Figure 3:
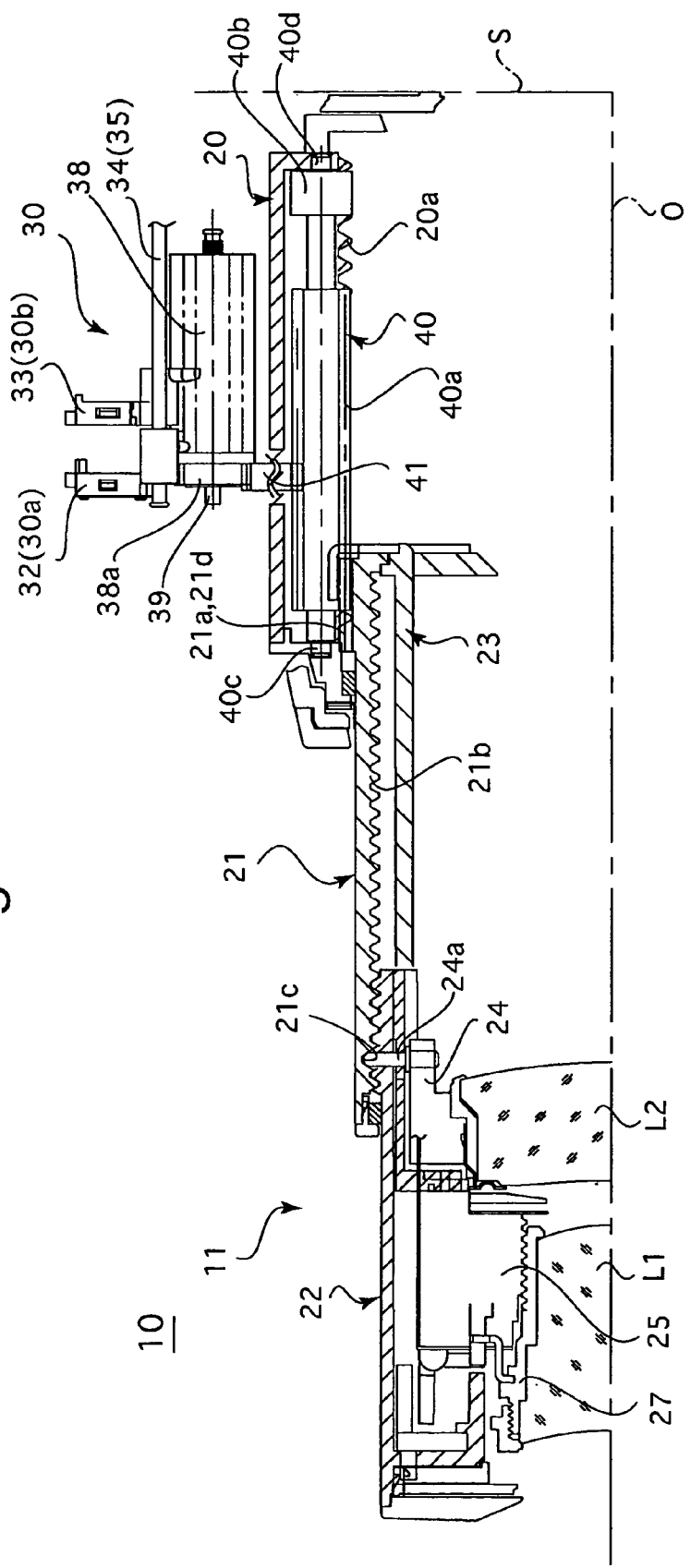
FIG. 3 is a view similar to that of FIG. 1, showing a state of the zoom lens at telephoto extremity.
Figure 4:
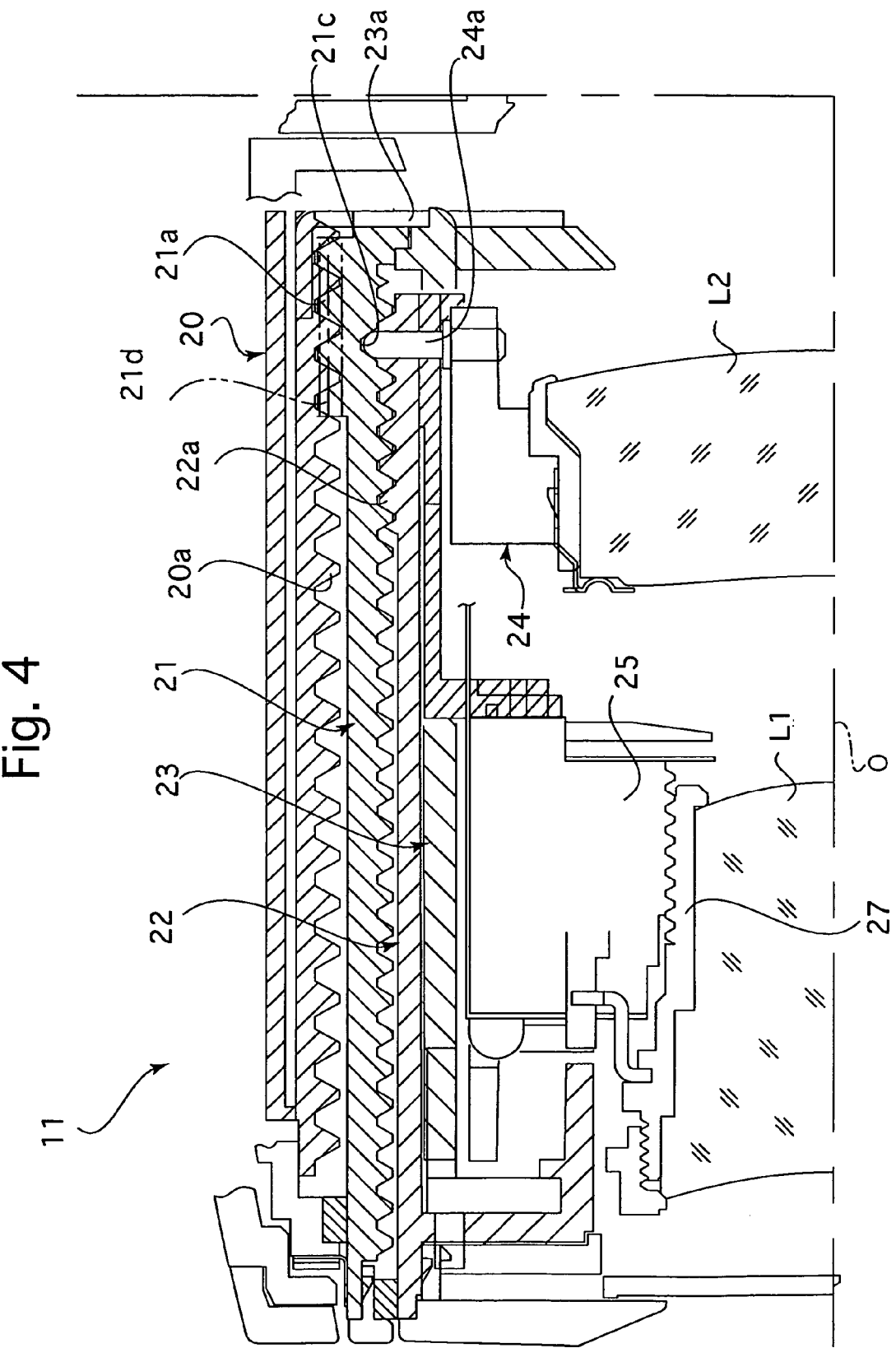
FIG. 4 is a view similar to that of FIG. 1, showing a retracted state of the zoom lens with the zoom viewfinder optical system of the zoom camera omitted.

FIGS. 1 through 4 each show a cross sectional view of a portion of an embodiment of a zoom camera 10 having a rotation transfer mechanism according to the present invention. Specifically, FIG. 1 shows a retracted state of the zoom camera 10, FIG. 2 shows a state of a zoom lens (zoom lens barrel) 11 of the zoom camera 10 at the wide-angle extremity, and FIG. 3 shows a state of the zoom lens 11 at the telephoto extremity.

The zoom lens 11 is provided with a cylindrical housing 20 which is positioned inside the zoom camera 10 to be fixed thereto. The housing 20 is provided on an inner peripheral surface thereof with a female helicoid 20a. The zoom lens 11 is provided radially inside the housing 20 with a cam/helicoid ring (rotatable ring/photographing-optical-system drive ring) 21 so that a male helicoid 21a formed on an outer peripheral surface of the cam/helicoid ring 21 is engaged with the female helicoid 20a of the housing 20. The zoom lens 11 is provided radially inside the cam/helicoid ring 21 with a first lens group support ring 22, and the cam/helicoid ring 21 is provided on an inner peripheral surface thereof with a female helicoid 21b which is engaged with a male helicoid 22a formed on an outer peripheral surface of the first lens group support ring 22.

Figure 5:
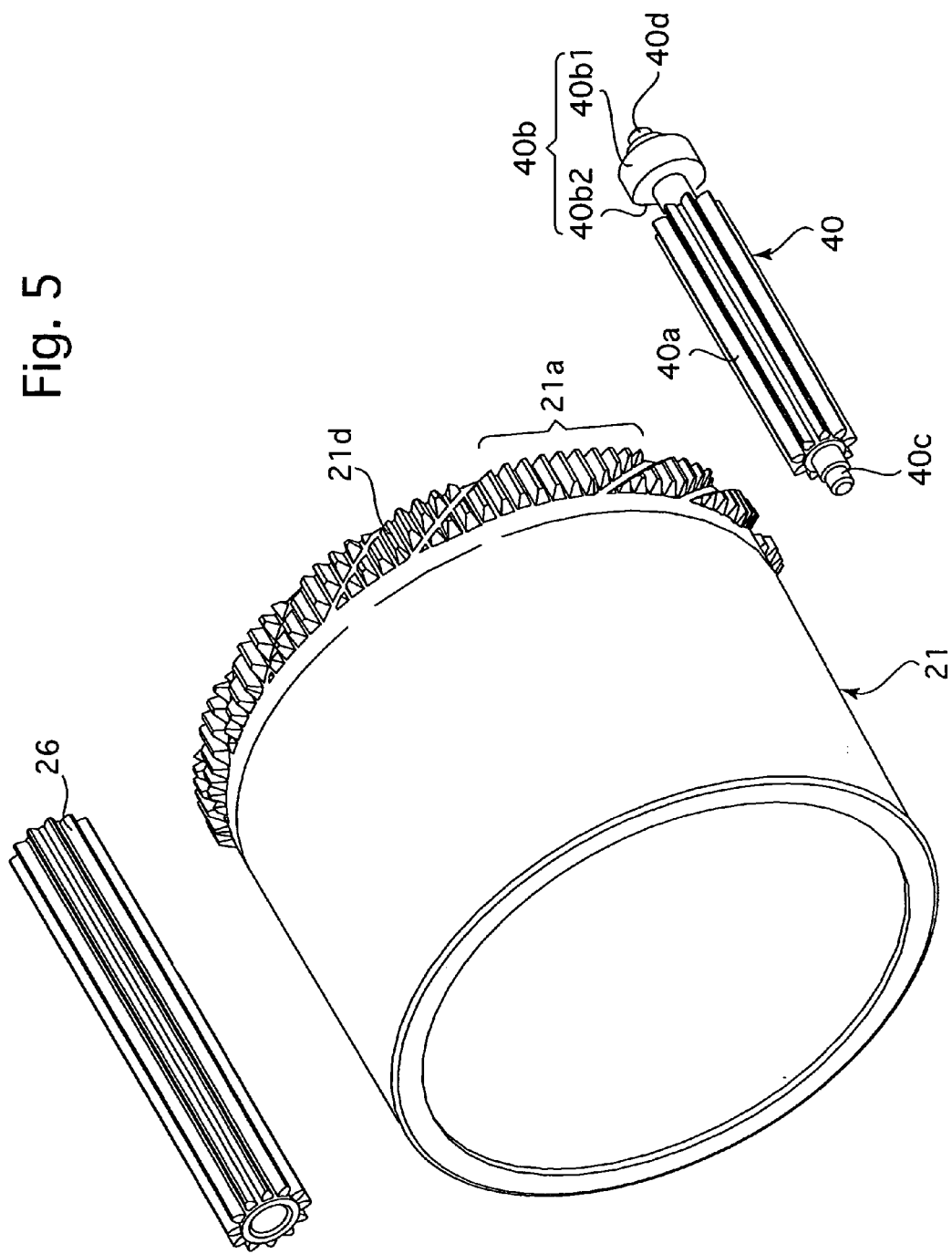
FIG. 5 is a perspective view of a cam/helicoid ring, a zoom gear and a viewfinder drive gear.
Figure 6:
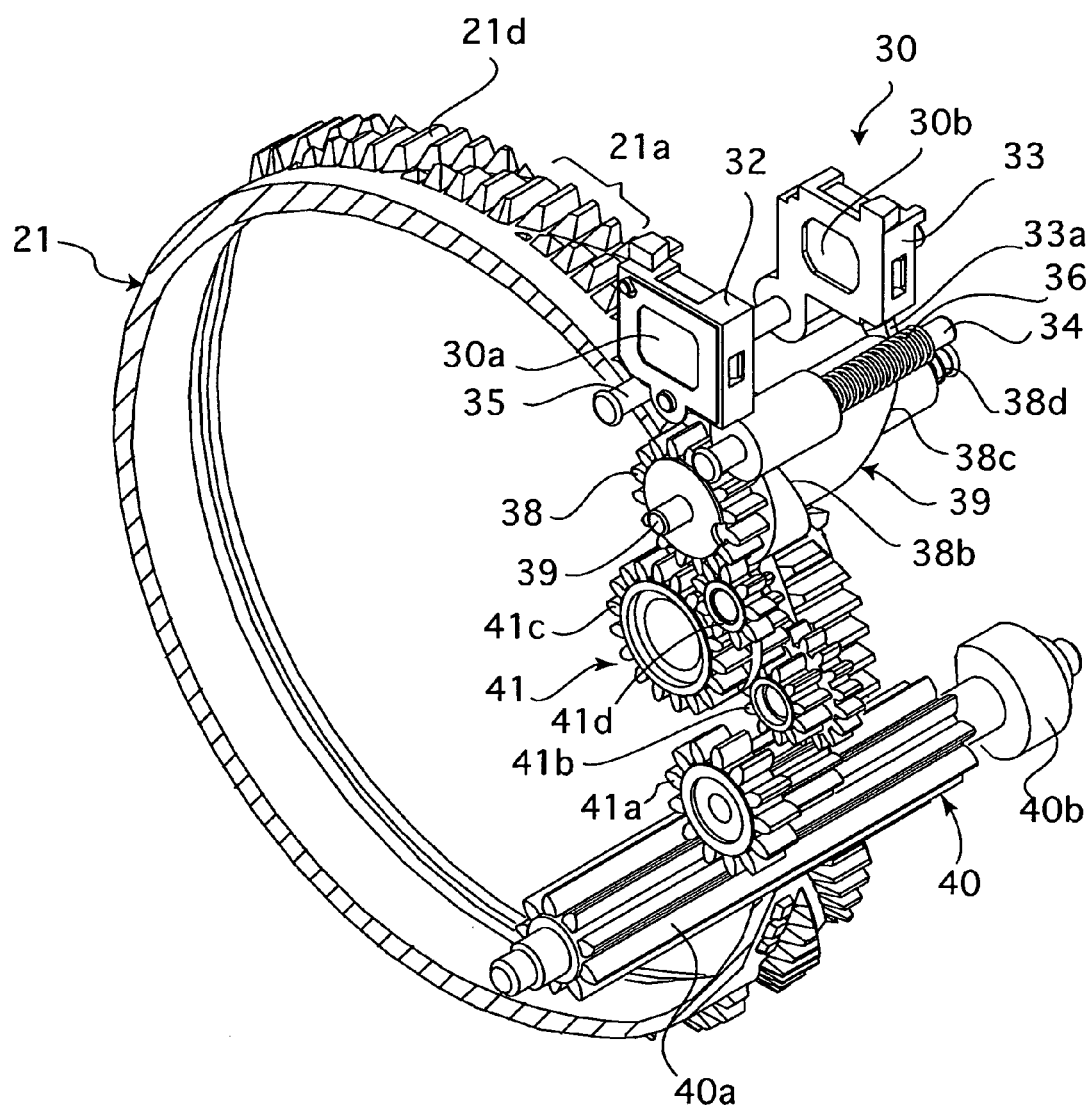
FIG. 6 is a perspective view, viewed obliquely from the front thereof, of a rotation transfer mechanism of the zoom camera shown in FIGS. 1 through 3 which transmits from the cam/helicoid ring to the zoom viewfinder optical system.
Figure 7:
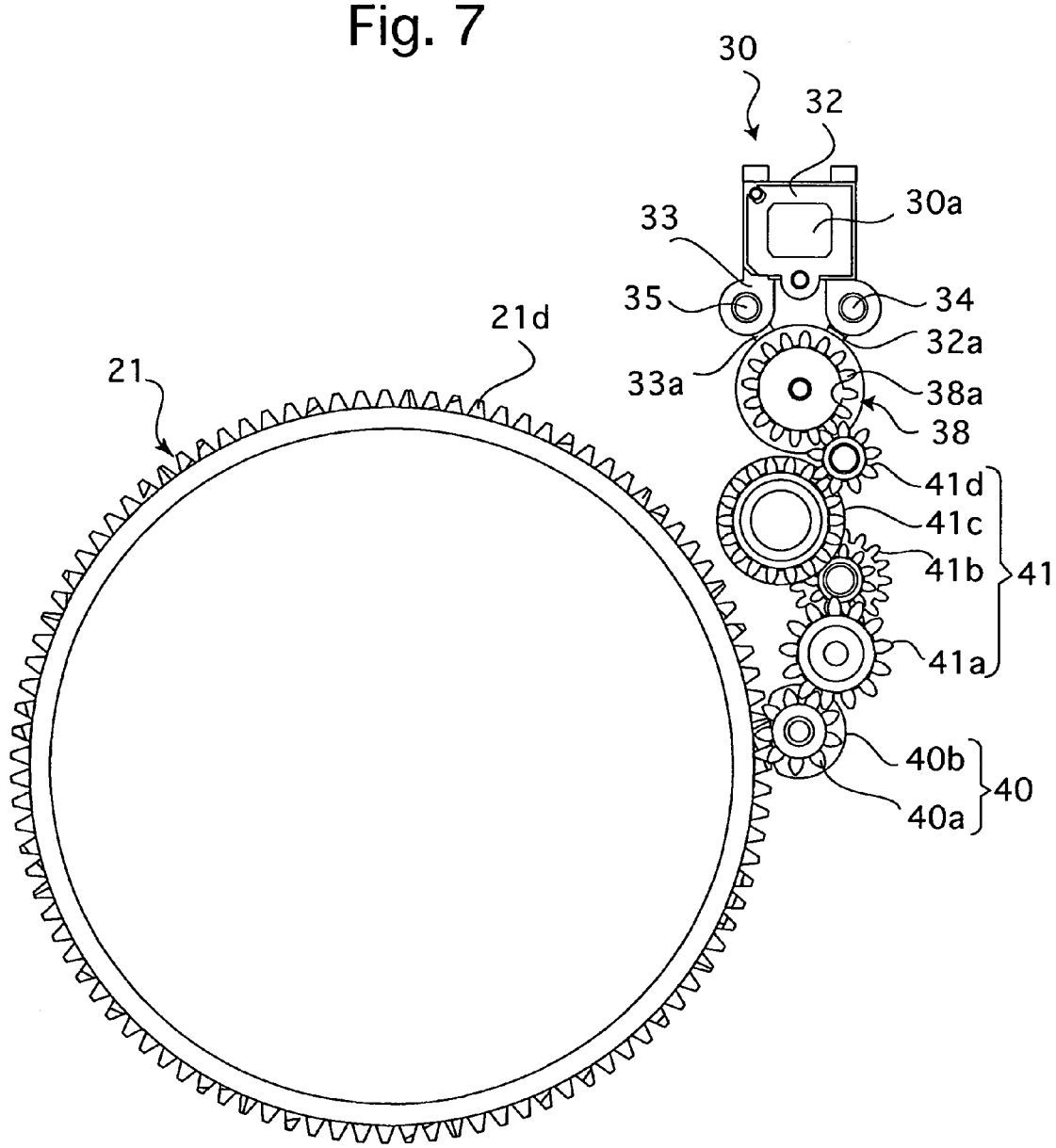
FIG. 7 is a front elevational view of the rotation transfer mechanism shown in FIG. 6.

The zoom lens 11 is provided radially inside the first lens group support ring 22 with a linearly movable ring 23. A set of linear guide grooves (not shown) which are elongated in a direction parallel to an optical axis O of a photographing optical system including a first lens group L1 and a second lens group L2 are formed on the housing 20, while a corresponding set of guide projections 23a which project radially outwards from the linearly movable ring 23 are slidably engaged in the set of linear guide grooves of the housing 20, respectively. The linearly movable ring 23 is coupled to the cam/helicoid ring 21 to be integrally movable in the optical axis direction together with the cam/helicoid ring 21 while allowing the cam/helicoid ring 21 to be rotatable about the optical axis O with respect to the linearly movable ring 23. The linearly movable member 23 is provided with a set of linear guide slots which are elongated in a direction parallel to the optical axis O, while a set of guide portions of the first lens group support ring 22 and a set of guide portions of a second lens group support ring 24 positioned behind the first lens group support ring 22 are slidably engaged in the set of linear guide slots of the linearly movable member 23, respectively. The first lens group support ring 22 supports the first lens group L1 via a shutter unit 25, and the linearly movable ring 23 supports the second lens group L2. The second lens group support ring 24 is provided with a set of follower pins 24a which project radially outwards to be slidably engaged in a set of cam grooves 21c formed on an inner peripheral surface of the cam/helicoid ring 21. Note that neither the set of cam grooves 21c nor the female helicoid 21b is shown in FIGS. 5 through 7 for clarity.

As shown in FIGS. 5 through 8, the cam/helicoid ring 21 is provided on threads of the male helicoid 21a with a spur gear (circumferential gear) 21d, each tooth of which extends in a direction parallel to the optical axis O. The spur gear 21d is in mesh with a zoom gear 26. The zoom gear 26 is rotatable on an axis of rotation parallel to the optical axis O, and is driven to rotate by a zoom motor (not shown).

With the above described structure of the zoom lens 11, driving the zoom motor to rotate the cam/helicoid ring 21 via the zoom gear 26 causes the cam/helicoid ring 21 to move forward or rearward in the optical axis direction while rotating about the optical axis O due to the engagement of the female helicoid 20a with the male helicoid 21a. The linearly movable ring 23 linearly moves together with the cam/helicoid ring 21 in the optical axis direction without rotating. The first lens group support ring 22, which is linearly guided in the optical axis direction by the linearly movable ring 23 without rotating, moves in the optical axis direction with respect to the cam/helicoid ring 21 due to the engagement of the female helicoid 21b with the male helicoid 22a when the cam/helicoid ring 21 moves forward or rearward while rotating. Likewise, the second lens group support ring 24, which is linearly guided in the optical axis direction by the linearly movable ring 23 without rotating, moves in the optical axis direction with respect to the cam/helicoid ring 21 due to the engagement of the set of cam grooves 21c with the set of follower pins 24a when the cam/helicoid ring 21 moves forward or rearward while rotating. Accordingly, driving the zoom motor changes both the distance between a picture plane S and the first lens group L1 and a distance between the picture plane S and the second lens group L2 while changing the distance between the first lens group L1 and the second lens group L2 in the optical axis direction to thereby perform a zooming operation.

A focusing operation is performed by moving the first lens group L1 independently. A lens holder 27 which holds and supports the first lens group L1 is supported by the shutter unit 25 via fine screw-threads, and rotating the lens holder 27 by a focusing motor (not shown) causes the lens holder 27 to move forward or rearward in the optical axis direction.

Figure 9:
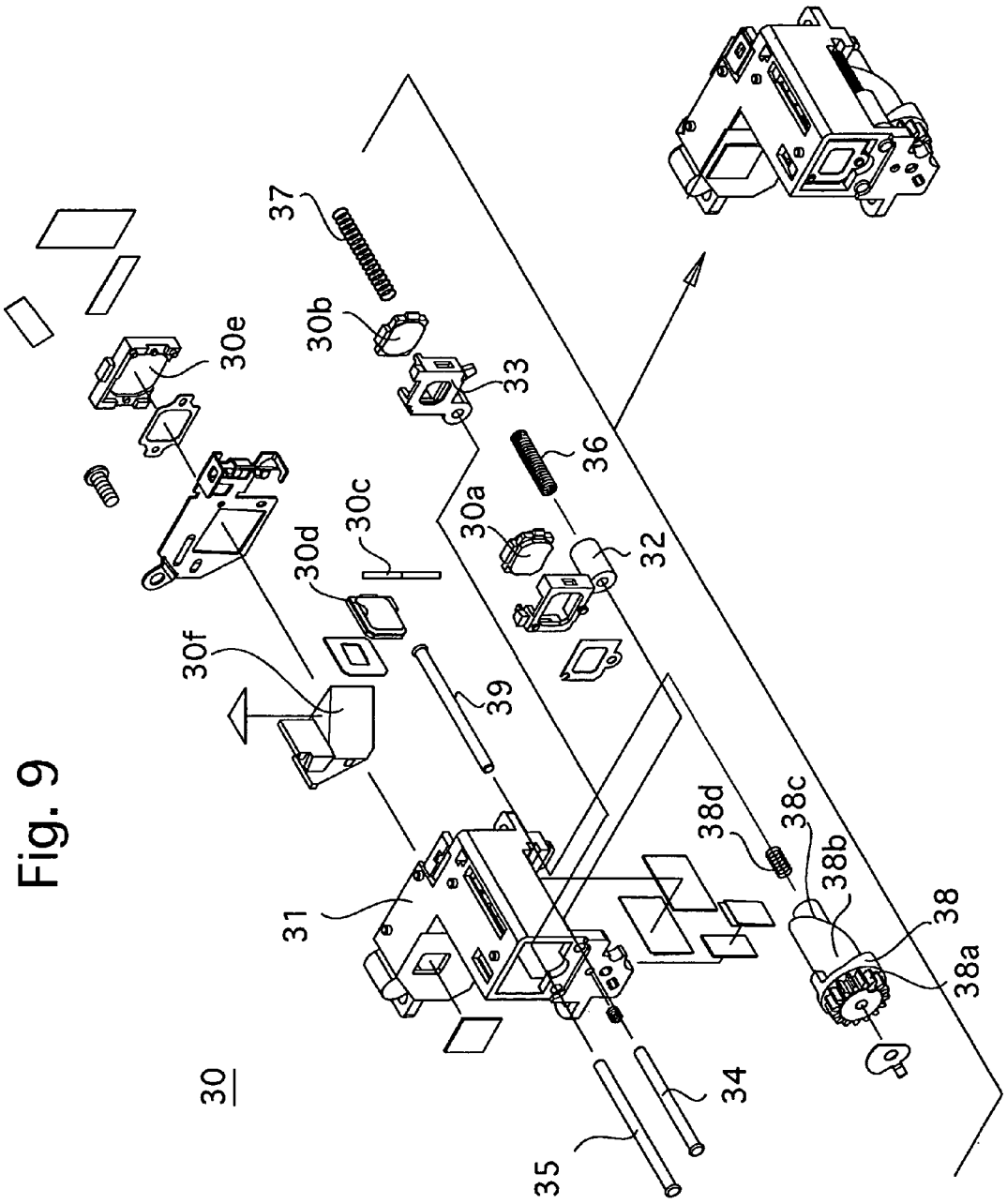
FIG. 9 is an exploded perspective view of a viewfinder unit of the zoom camera.
Figure 10:
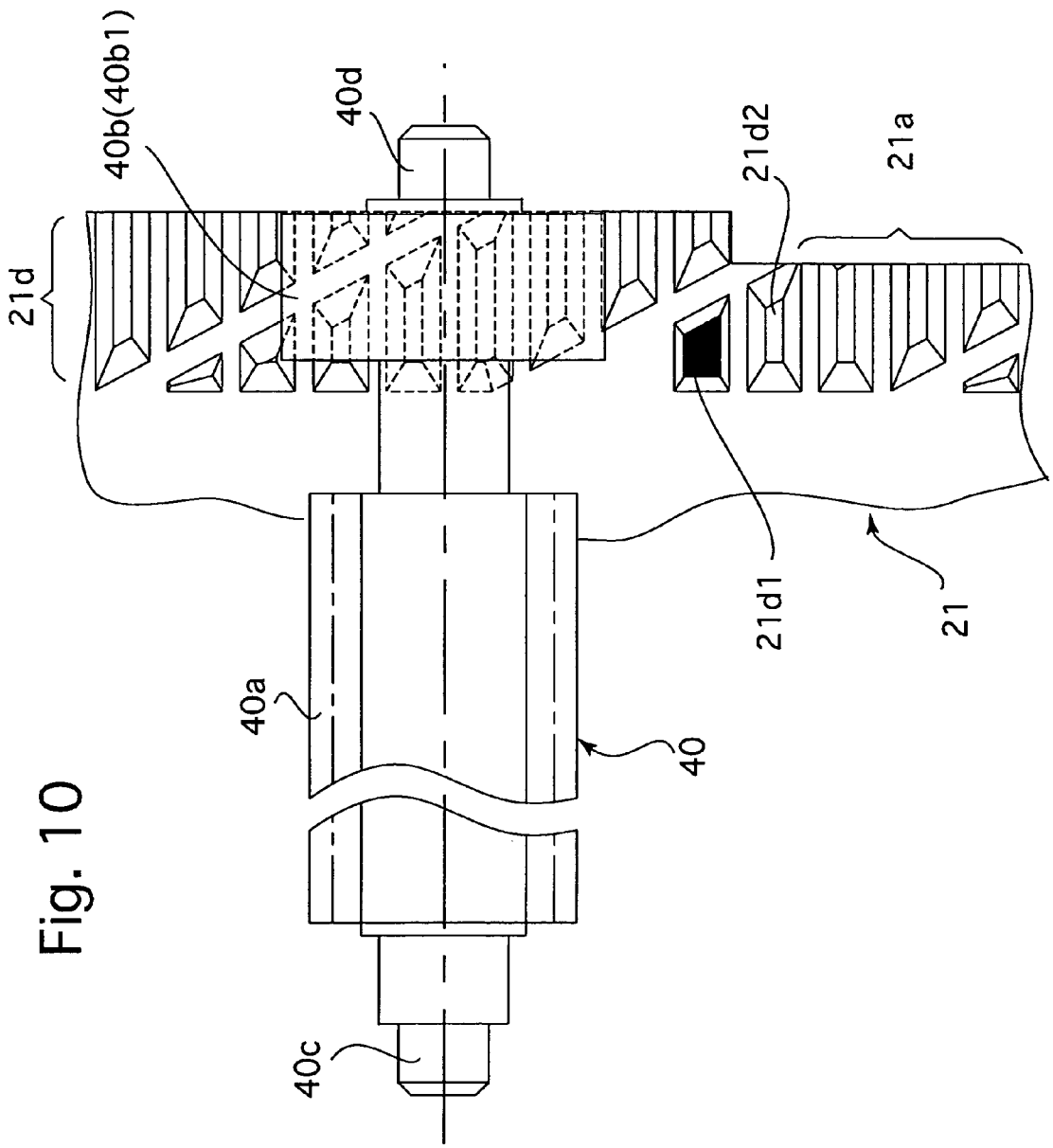
FIG. 10 is a developed view, partly omitted, of the viewfinder drive gear and the cam/helicoid ring, showing a positional relationship therebetween in a retracted state of the zoom lens.

The zoom camera 10 is provided above the zoom lens 11 with a zoom viewfinder 30, the focal length of which varies to correspond to the focal length of the zoom lens 11. As shown in FIG. 9, the zoom viewfinder 30 is provided with a zoom type viewing optical system including a first movable power-varying lens 30a, a second movable power-varying lens 30b, a mirror 30c, a fixed lens 30d, a prism (erecting system) 30f and an eyepiece 30e, in that order from the object side along a viewfinder optical axis. These optical elements 30a through 30e are supported by a viewfinder support frame 31 which is fixed to the housing 20. The zoom viewfinder 30 is provided with a first movable frame (driven member) 32 and a second movable frame (driven member) 33 which hold the first movable power-varying lens 31a and the second movable power-varying lens 31b, respectively. The first movable frame 32 and the second movable frame 33 are guided in the optical axis direction by a first guide shaft 34 and a second guide shaft 35 which extend in a direction parallel to the optical axis O, respectively. The first movable frame 32 and the second movable frame 33 are biased forward, toward the objective side, by a first compression coil spring 36 and a second compression coil spring 37, respectively. The zoom viewfinder 30 is provided with a cam-incorporated gear (driving-direction converter/cylindrical cam) 38 having a substantially cylindrical shape. The cam-incorporated gear 38 is fitted on a rotational shaft 39 to be supported thereon. The rotational shaft 39 is fixed to the viewfinder support frame 31 to extend parallel to the optical axis O.

Figure 18:
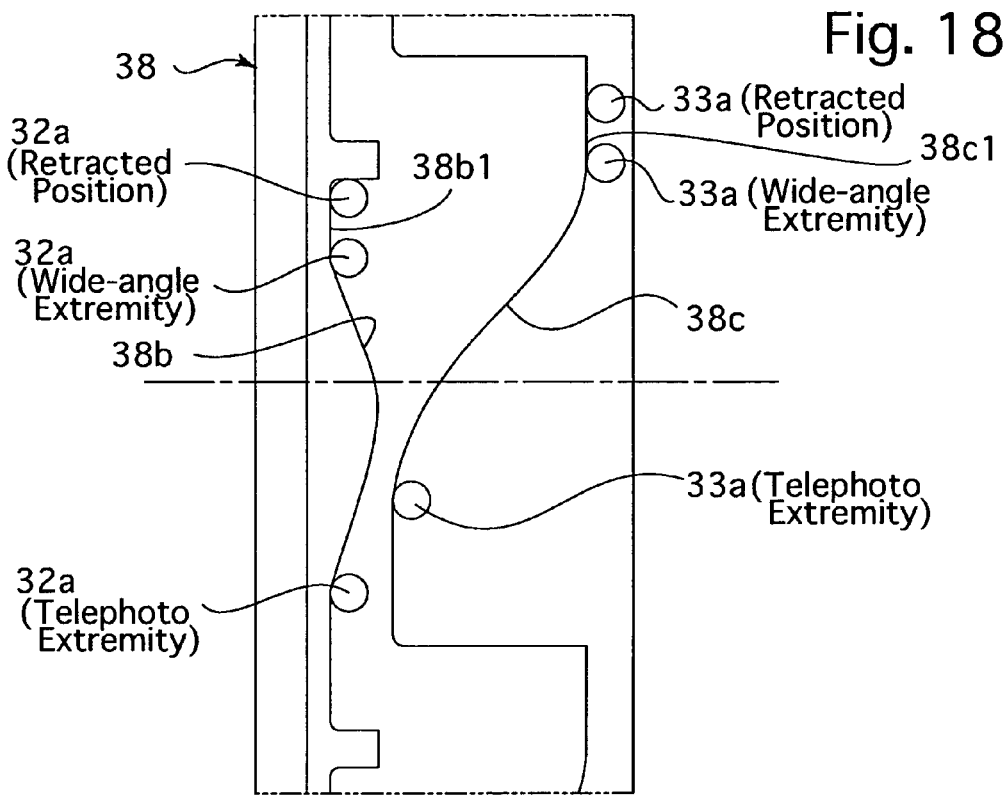
FIG. 18 is a developed view of a cam-incorporated gear of a viewfinder system serving an element of the zoom viewfinder shown in FIG. 1.

As shown in FIGS. 6 through 9, the cam-incorporated gear 38 is provided at the front end thereof with a spur gear portion 38a. The cam-incorporated gear 38 is provided immediately behind the spur gear portion 38a with a first cam surface 38b, and is provided between the first cam surface 38b and the rear end of the cam-incorporated gear 38 with a second cam surface 38c. The cam-incorporated gear 38 is biased forward by a compression coil spring 38d to remove backlash. A first follower pin 32a projected from the first movable frame 32 is pressed against the first cam surface 38b by the spring force of the first compression coil spring 36, while a second follower pin 33a projected from the second movable frame 33 is pressed against the second cam surface 38c by the spring force of the second compression coil spring 37. A rotation of the cam-incorporated gear 38 causes the first movable frame 32 and the second movable frame 33, that respectively hold the first movable power-varying lens 30a and the second movable power-varying lens 30b, to move in the optical axis direction in a predetermined moving manner while changing the space therebetween in accordance with the contours of the first cam surface 38b and the second cam surface 38c to vary the focal length of the zoom viewfinder in synchronization with the focal length of the zoom lens 11. FIG. 18 is a developed view of an outer peripheral surface of the cam-incorporated gear 38, showing the positional relationship between the first follower pin 32a and the first cam surface 38b and the positional relationship between the second follower pin 33a and the second cam surface 38c in each of three different states, i.e., at the wide-angle extremity, the telephoto extremity and the retracted position of the zoom lens 11.

Figure 8:
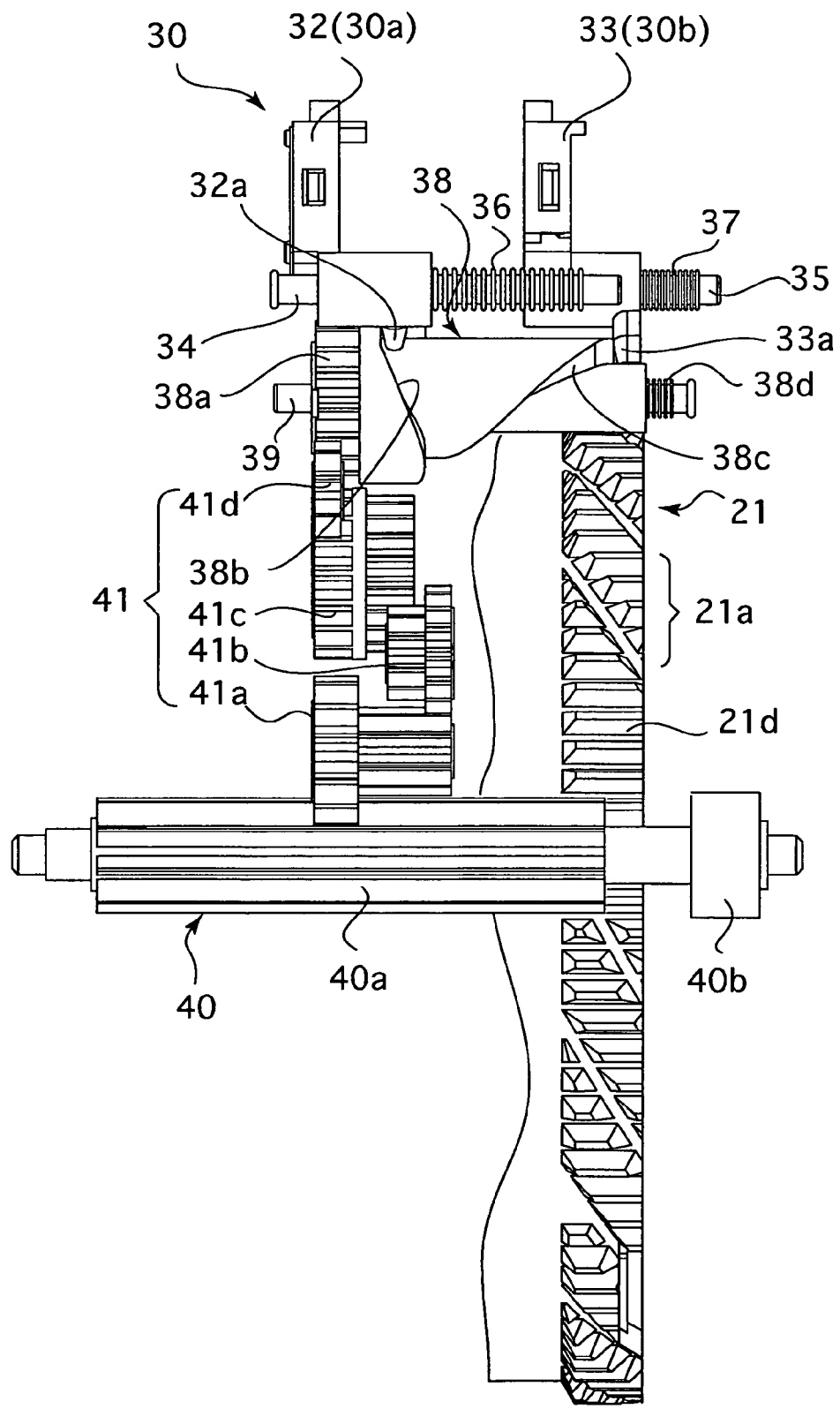
FIG. 8 is a side elevational view of the rotation transfer mechanism shown in FIG. 6.

The zoom camera 10 is provided between the cam/helicoid ring 21 and the cam-incorporated gear 38 with a viewfinder drive gear (rotation transfer gear shaft/associated-optical-system drive gear shaft) 40 and a gear train (reduction gear train) 41. The viewfinder drive gear 40 is provided with a spur gear portion 40a which is in mesh with the spur gear 21d of the cam/helicoid ring 21. Rotation of the zoom motor is transferred from the spur gear 21d to the cam-incorporated gear 38 via the viewfinder drive gear 40 and the gear train 41. The viewfinder drive gear 40 is provided behind the spur gear portion 40a with a semi-cylindrical portion (rotation limit portion) 40b, and is further provided with a front rotational pin 40c and a rear rotational pin 40d which project from the front end of the spur gear portion 40a and the rear end of the semi-cylindrical portion 40b, respectively, so that the front rotational pin 40c and the rear rotational pin 40d are positioned on a common rotational axis of the viewfinder drive gear 40. The front rotational pin 40c is rotatably fitted into a front bearing hole formed on a camera body of the zoom camera 10 while the rear rotational pin 40d is rotatably fitted into a rear bearing hole formed on the camera body (see FIGS. 1 through 3). The viewfinder drive gear 40 that is supported in such a manner is rotatable about its rotational axis (the rotational pins 40c and 40d) extending parallel to the rotational axis of the cam/helicoid ring 21, and is immovable in the optical axis direction. The gear train 41 is composed of a plurality of gears: a first gear 41a, a second gear 41b, a third gear 41c and a fourth gear 41d. Each of the first through third gears 41a, 41b and 41c is a double gear consisting of a large gear and a small gear, and the fourth gear 41d is a simple spur gear as shown in FIGS. 6 through 8. The first gear 41a is engaged with the spur gear portion 40a of the viewfinder drive gear 40 while the fourth gear 41d is engaged with the spur gear portion 38a of the cam-incorporated gear 38.

As shown in FIGS. 1 through 3, the cam/helicoid ring 21 moves in the optical axis direction while rotating while the zoom lens 11 changes from the retracted position (the position shown in FIG. 1) to the telephoto extremity (the position shown in FIG. 3). The viewfinder drive gear 40 does not rotate about the optical axis O during the time the cam/helicoid ring 21 rotates about the optical axis O while moving in the optical axis direction, i.e., during the time the zoom lens 11 is extended forward from the retracted position to a position immediately behind the wide-angle extremity (i.e., immediately behind the zooming range). The viewfinder drive gear 40 rotates at a fixed position in association with the cam/helicoid ring 21 only when the zoom lens 11 is in the zoom range between the wide-angle extremity and the telephoto extremity. Namely, in the viewfinder drive gear 40, the spur gear portion 40a is formed thereon to occupy only a front small part of the viewfinder drive gear 40, so that the spur gear portion 40a is not in mesh with the spur gear 21d of the cam/helicoid ring 21 in the retracted state of the zoom lens 11 because the spur gear 21d is positioned behind the spur gear portion 40a of the viewfinder drive gear 40 in the retracted state of the zoom lens 11 shown in FIG. 1. The spur gear 21d reaches the spur gear portion 40a to mesh therewith immediately before the zoom lens 11 reaches the wide-angle extremity (FIG. 2). Thereafter, although the position of the spur gear 21d in the optical axis direction gradually changes forwardly from the wide-angle extremity to the telephoto extremity (FIG. 3), the spur gear 21d remains in mesh with the spur gear portion 40a because the spur gear portion 40a is sufficiently long in the optical axis direction to correspond to the amount of movement of the spur gear 21d.

Figure 15:
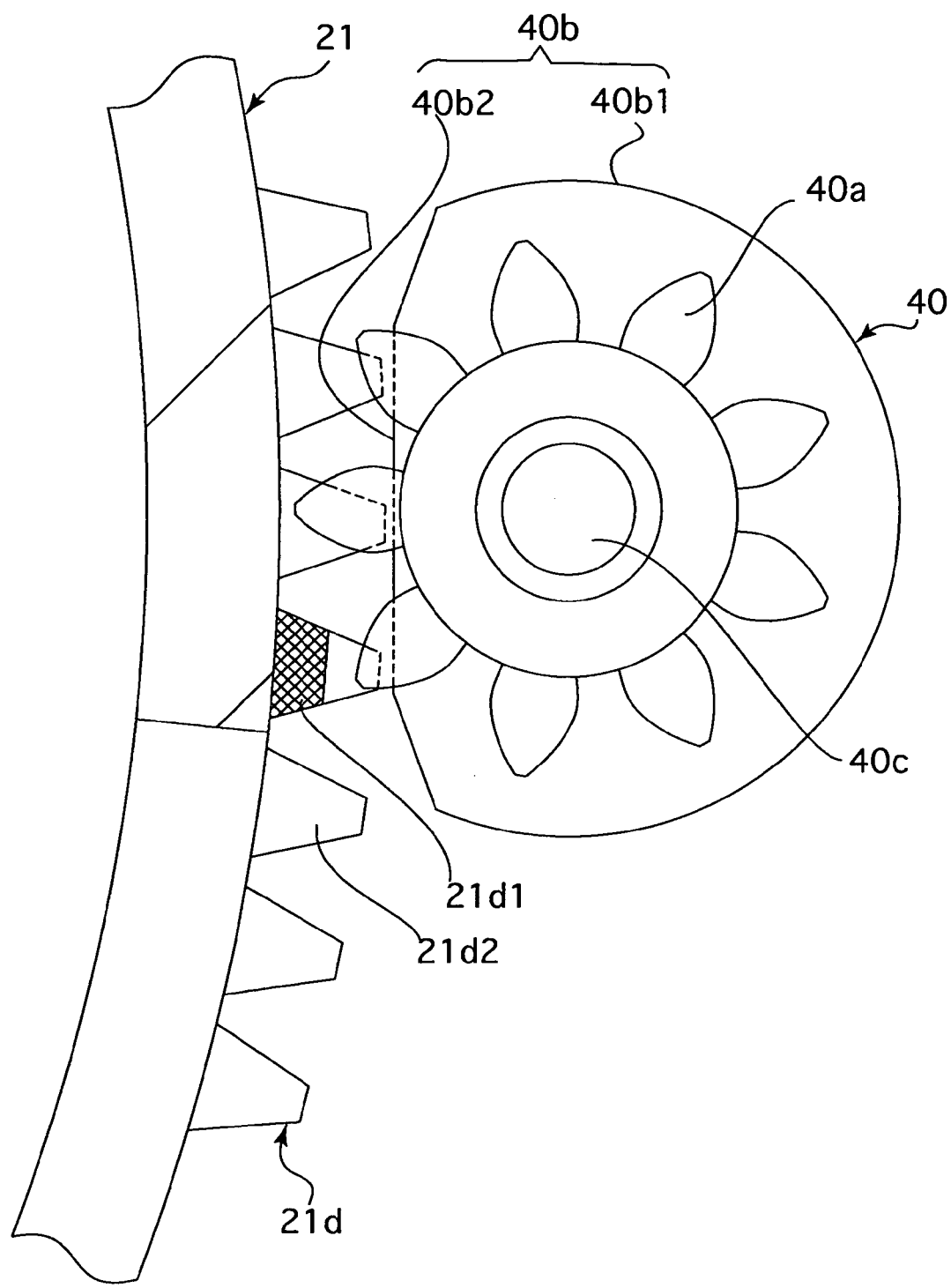
FIG. 15 is a front elevational view of the viewfinder drive gear and a portion of the helicoid ring which are shown in FIGS. 10 and 11, showing an angular position of the viewfinder drive gear in the state shown in FIGS. 10 and 11.
Figure 16:
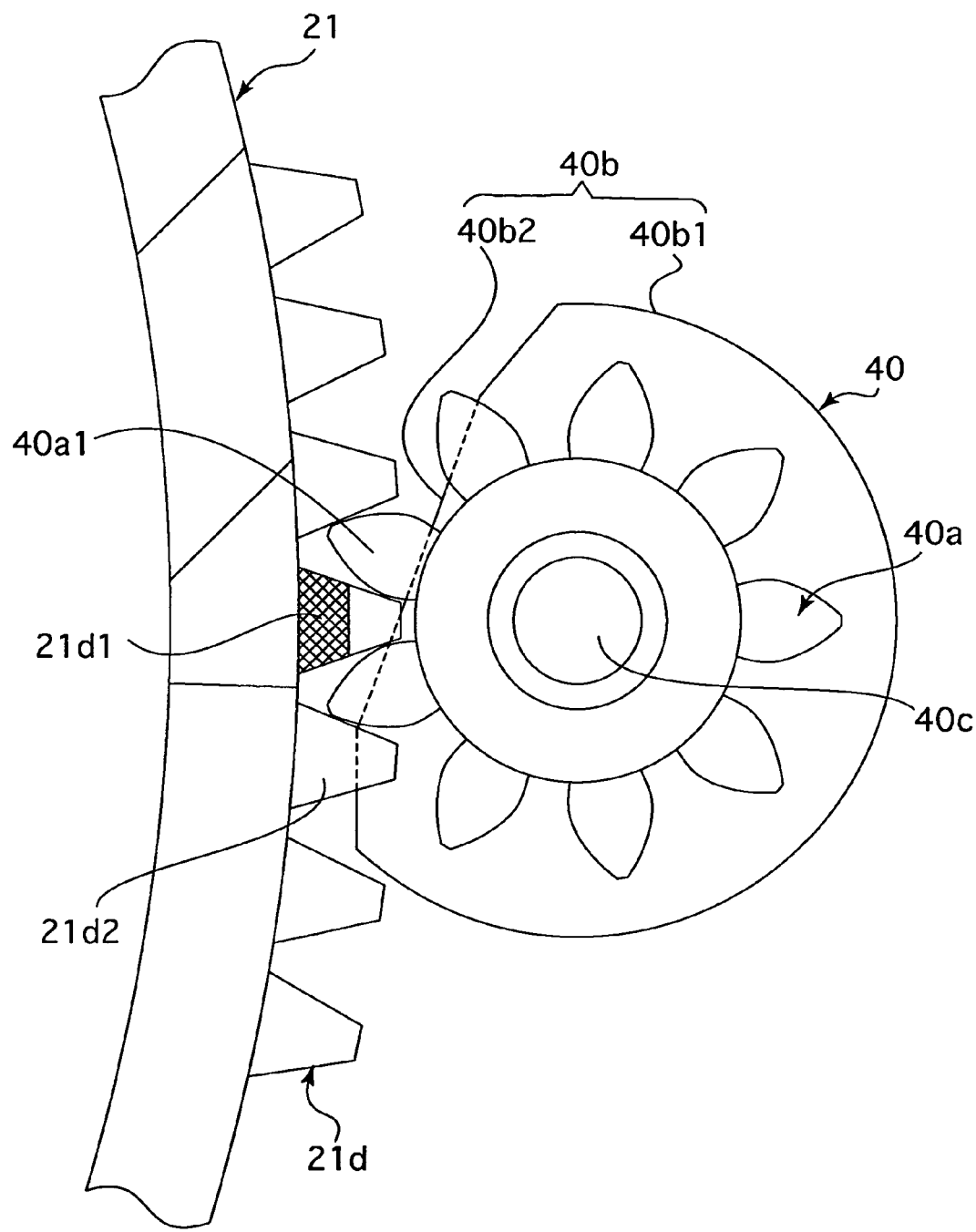
FIG. 16 is a front elevational view of the viewfinder drive gear and a portion of the helicoid ring which are shown in FIG. 12, showing an angular position of the viewfinder drive gear in the state shown in FIG. 12.
Figure 17:
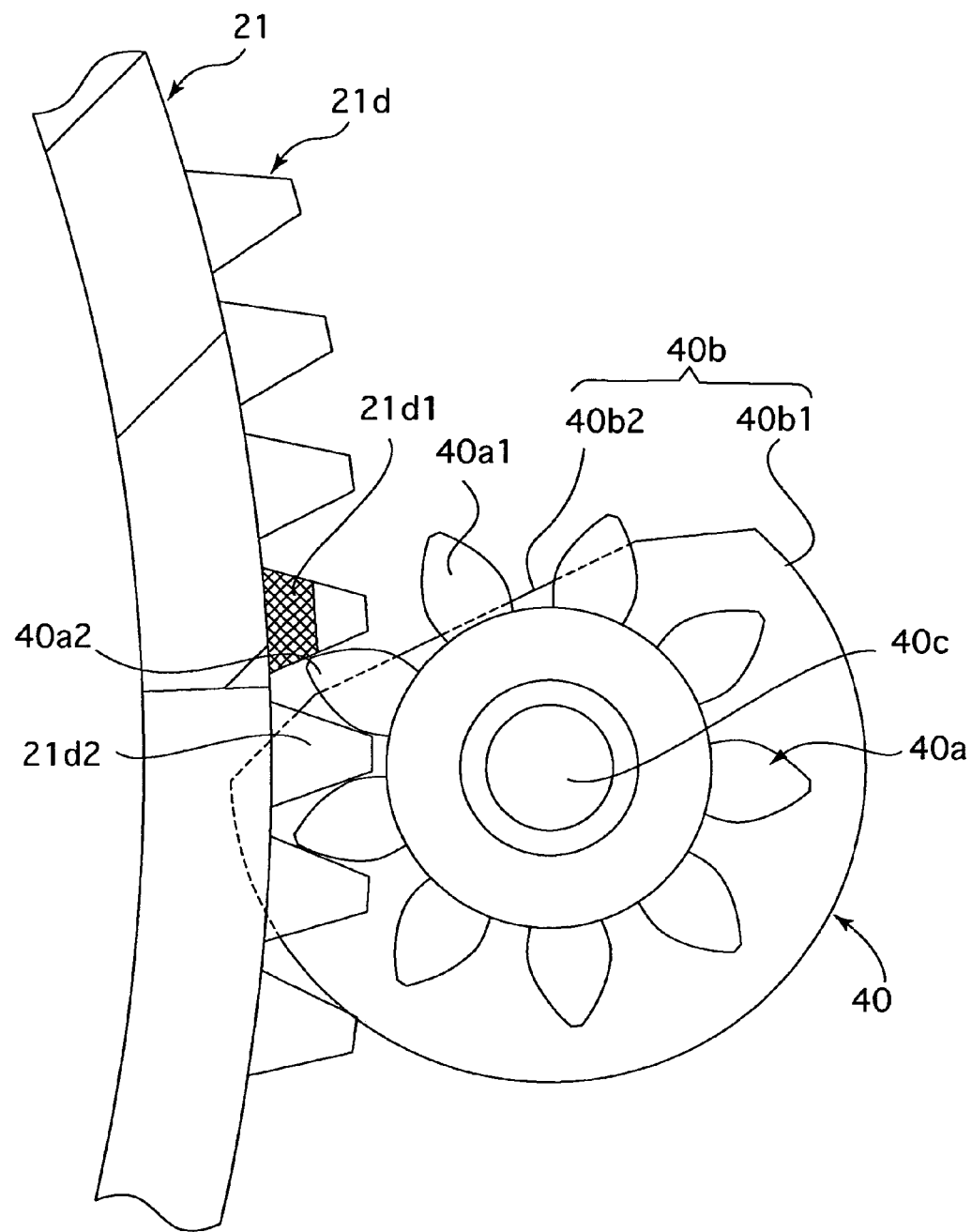
FIG. 17 is a front elevational view of the viewfinder drive gear and a portion of the helicoid ring which are shown in FIG. 13, showing an angular position of the viewfinder drive gear in the state shown in FIG. 13.

As shown in FIGS. 15 through 17, the semi-cylindrical portion 40b of the viewfinder drive gear 40 is provided with an incomplete cylindrical portion 40b1 and a flat surface portion 40b2 which is formed as a cut-away portion of the incomplete cylindrical portion 40b1 so that the flat surface portion 40b2 extends along the rotational axis of the viewfinder drive gear 40. Accordingly, the semi-cylindrical portion 40b has a non-circular cross section, i.e., a substantially D-shaped cross section. As can be seen in FIGS. 15 through 17, some specific teeth of the spur gear portion 40a adjacent to the flat surface portion 40b2 project radially outwards beyond the position of the flat surface portion 40b2 in a direction of engagement of the some specific teeth of the spur gear portion 40a with the spur gear 21d (i.e., horizontal direction as viewed in FIG. 15). The flat surface portion 40b2 is formed as a flat surface including a straight line parallel to the rotational axis (the front rotational pin 40c and the rear rotational pin 40d) of the viewfinder drive gear 40. When the zoom lens 11 is in the retracted state, the viewfinder drive gear 40 is in its specific angular position in which the flat surface portion 40b2 faces the spur gear 21d of the cam/helicoid ring 21 as shown in FIG. 15. In this state shown in FIG. 15, the viewfinder drive gear 40 cannot rotate even if driven to rotate because the flat surface portion 40b2 is in close vicinity of the addendum circle of the spur gear 21d. Namely, even if the viewfinder drive gear 40 tries to rotate in the state shown in FIG. 15, the flat surface portion 40b2 would hit the teeth of the spur gear 21d, so that the viewfinder drive gear 40 cannot rotate.

Figure 11:
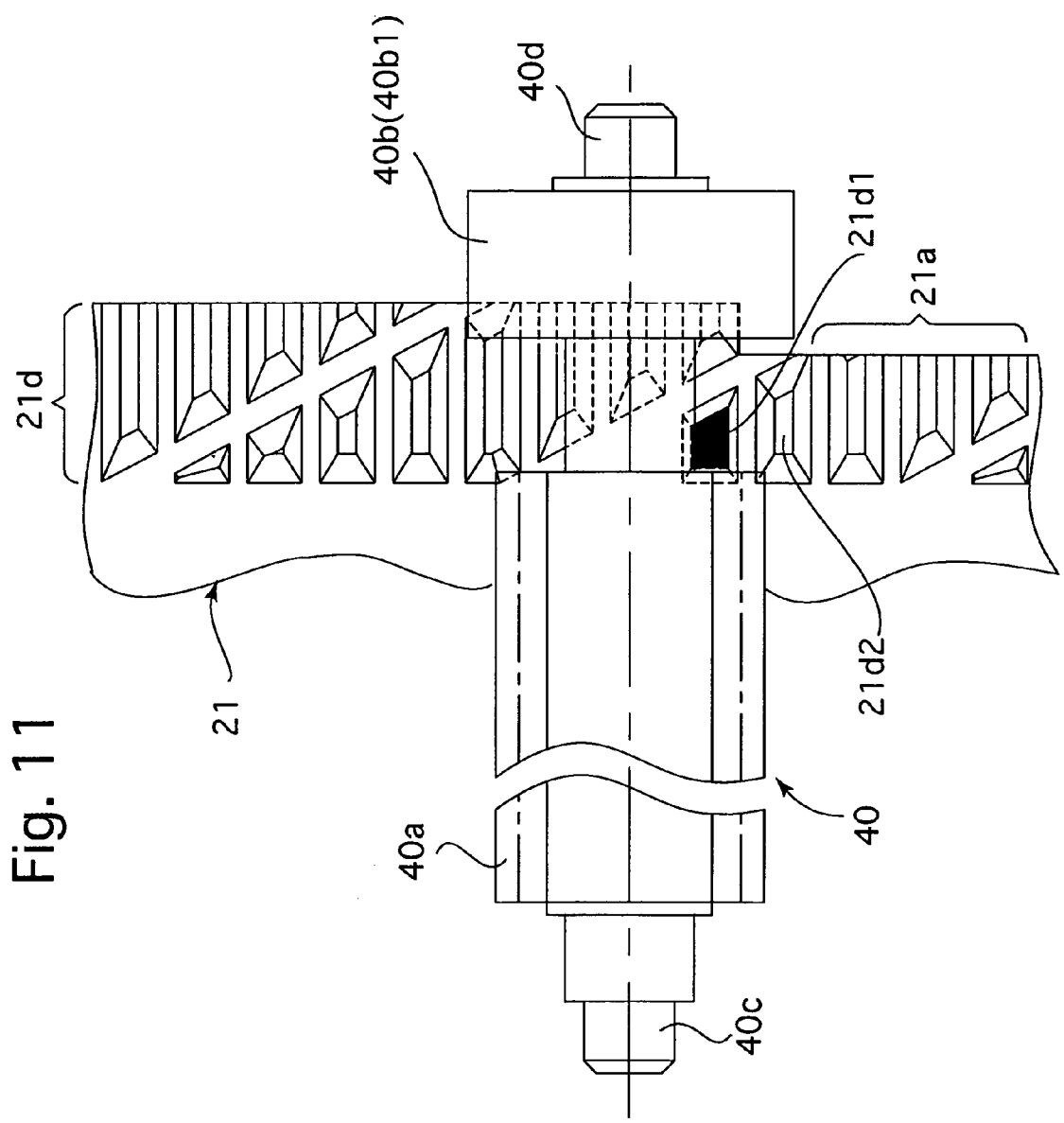
FIG. 11 is a view similar to that of FIG. 10, showing a state subsequent to the state shown in FIG. 10 where the viewfinder drive gear is prohibited from rotating in association with the cam/helicoid ring.

FIG. 11 shows a state where the cam/helicoid ring 21 has moved forward to a point beyond the retracted position thereof while rotating, specifically a point slightly behind the wide-angle extremity. Even in this state shown in FIG. 11, the viewfinder drive gear 40 is prohibited from rotating since the flat surface portion 40b2 faces the spur gear 21d of the cam/helicoid ring 21.

Figure 12:
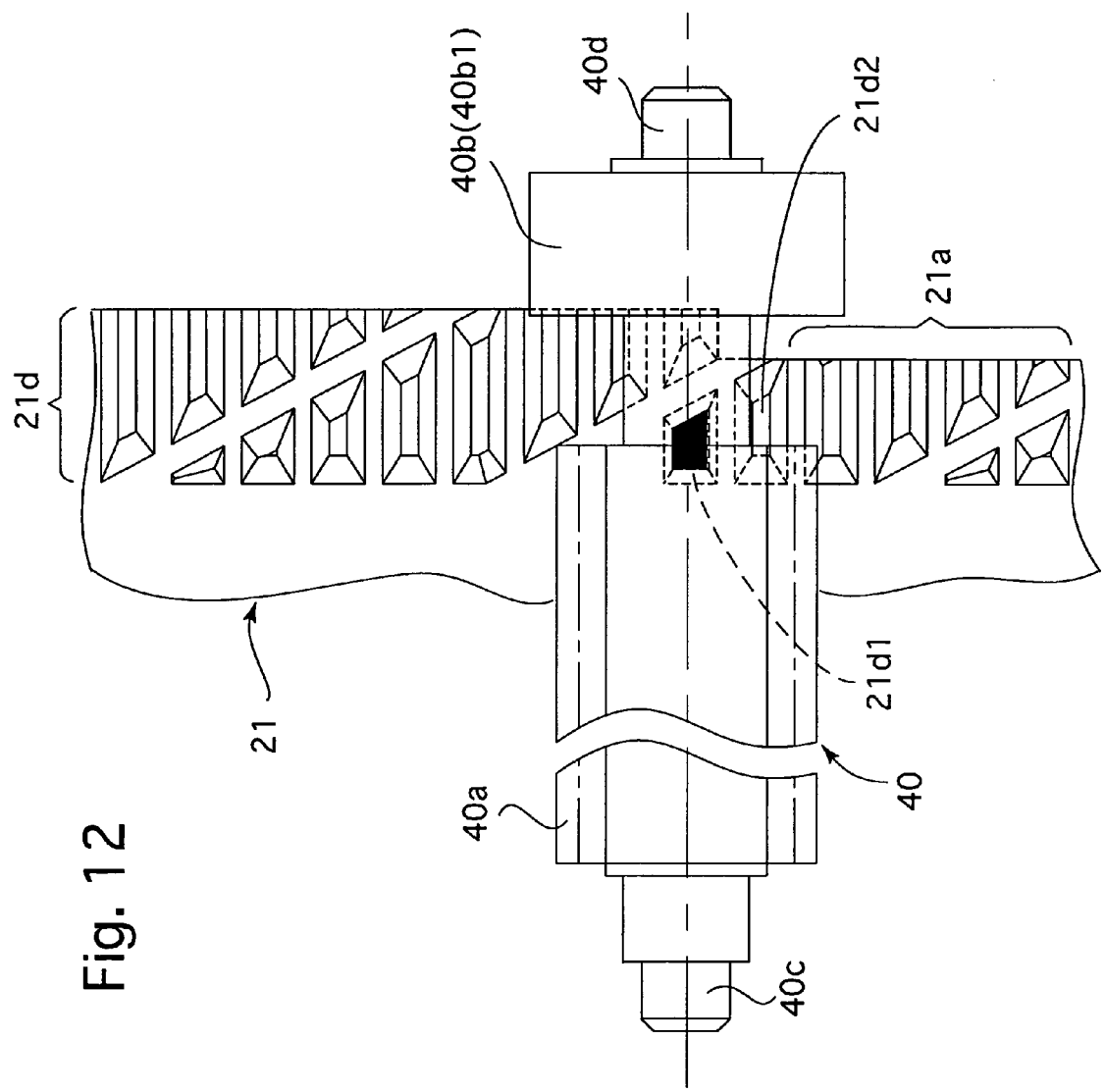
FIG. 12 is a view similar to that of FIG. 10, showing a state subsequent to the state shown in FIG. 11 where the viewfinder drive gear becomes rotatable in association with the cam/helicoid ring.
Figure 13:
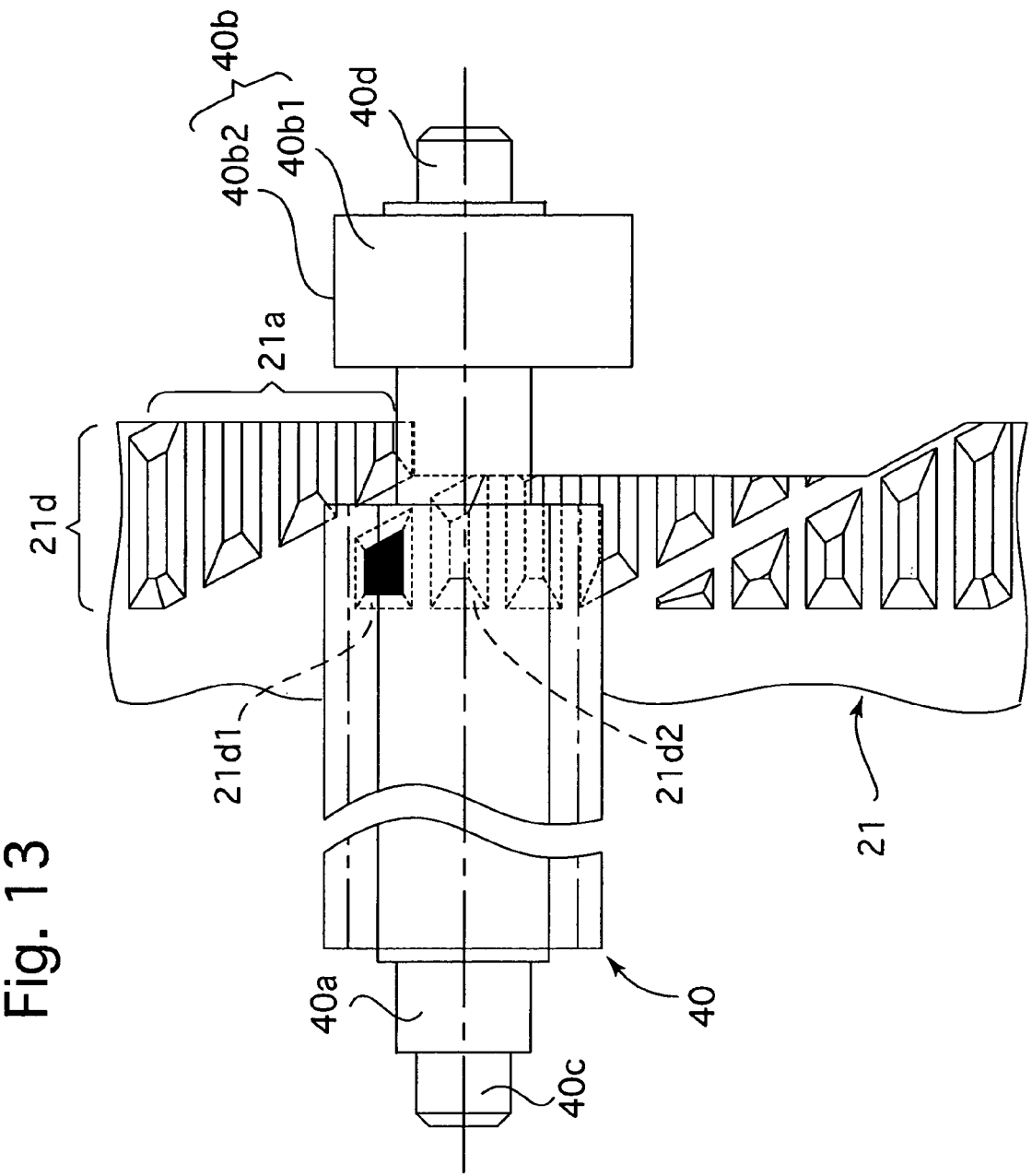
FIG. 13 is a view similar to that of FIG. 10, showing a positional relationship between the viewfinder drive gear and the cam/helicoid ring when the zoom lens is set at the wide-angle extremity.

As shown in FIG. 12, immediately after the cam/helicoid ring 21 advances to a point where a front end of the spur gear 21d comes into engagement with the spur gear portion 40a of the viewfinder drive gear 40, the spur gear 21d is positioned in front of the flat surface portion 40b2 so that the flat surface portion 40b2 does not face the spur gear 21d of the cam/helicoid ring 21. This allows the viewfinder drive gear 40 to rotate, so that the viewfinder drive gear 40 commences to rotate in association with the cam/helicoid ring 21 (see FIG. 16). FIG. 13 (FIG. 17) shows a state where the cam/helicoid ring 21 slightly advances from this commencement of rotation of the viewfinder drive gear 40. This state corresponds to a state of the zoom lens optical system at wide-angle extremity.

Figure 14:
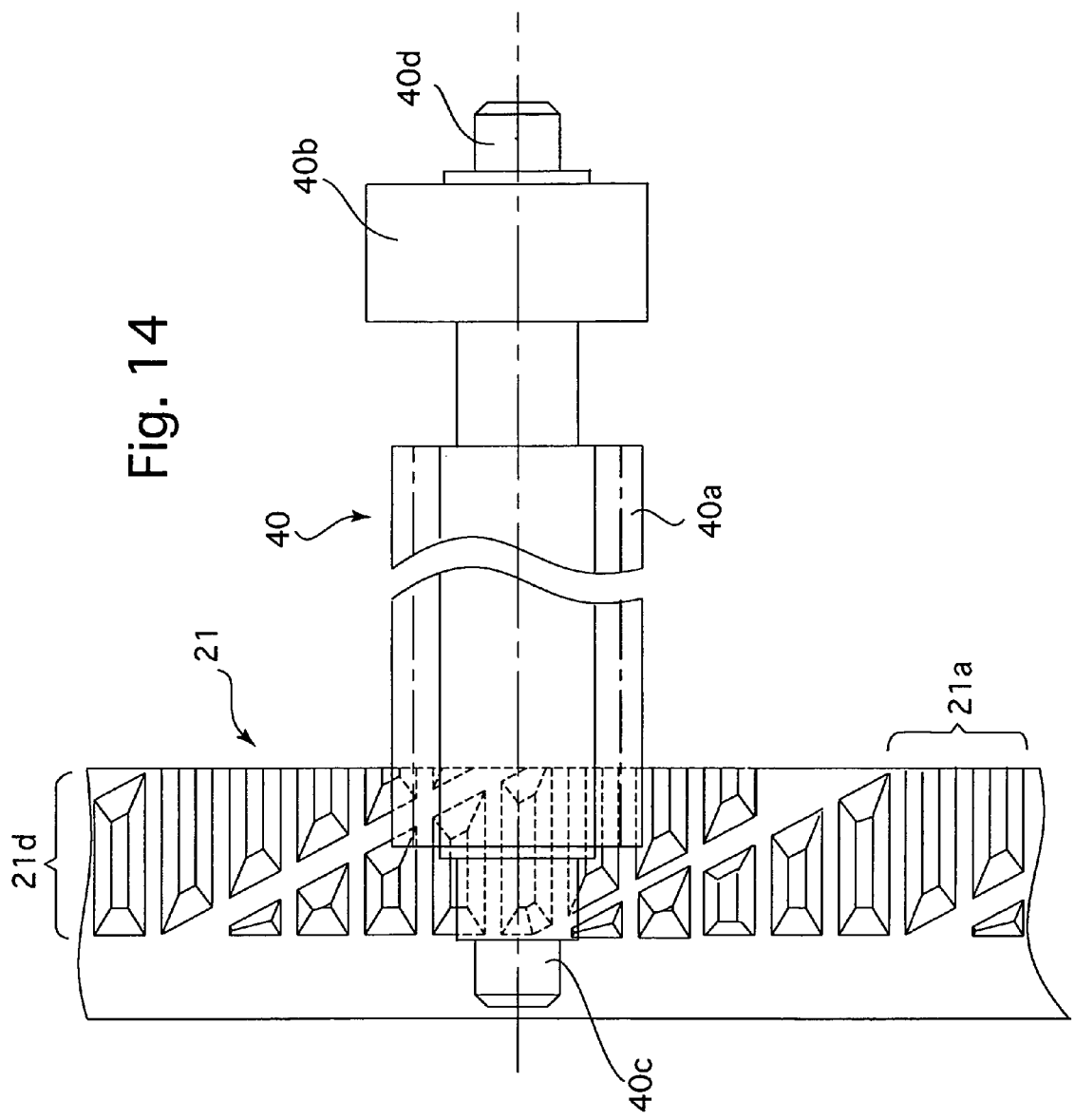
FIG. 14 is a view similar to that of FIG. 10, showing a positional relationship between the viewfinder drive gear and the cam/helicoid ring when the zoom lens is set at the telephoto extremity.

Subsequently, the cam/helicoid ring 21 moves forward while rotating from the wide-angle extremity to the telephoto extremity as described above. The spur gear portion 40a of the viewfinder drive gear 40 is formed to be longer than the spur gear 21d of the cam/helicoid ring 21 to a sufficient degree in the optical axis direction (in a direction of the rotational axis of the viewfinder drive gear 40) to remain engaged with the spur gear 21d when the cam/helicoid ring 21 moves between the position thereof at the wide-angle extremity and the position thereof at the telephoto extremity. When the zoom lens 11 is set at the telephoto extremity, a portion of the spur gear portion 40a of the viewfinder drive gear 40 in the vicinity of the front end thereof is engaged with the spur gear 21d of the cam/helicoid ring 21 as shown in FIG. 14.

In the above illustrated embodiment, with respect to the cam/helicoid ring 21 which moves in the optical axis direction while rotating throughout the entire moving range from the retracted position to the telephoto extremity, the spur gear portion 40a is formed on the specific portion of the viewfinder drive gear 40 which is engageable with the spur gear 21d only in substantially the ready-to-photograph state of the zoom lens 11 (between the wide-angle extremity and the telephoto extremity of the zoom lens 11). Moreover, the semi-cylindrical portion 40b is formed on the viewfinder drive gear 40 behind the spur gear portion 40a thereof, so that the viewfinder drive gear 40 is prohibited from rotating by making the semi-cylindrical portion 40b and the spur gear 21d face each other (or by interference of the semi-cylindrical portion 40b with the spur gear 21d) during the time the cam/helicoid ring 21 rotates about the optical axis O while moving in the optical axis direction at a non-photographing state of the zoom lens 11 (i.e., when the zoom lens 11 is positioned between the retracted position and the position immediately behind the wide-angle extremity). Due to this structure, although the viewfinder drive gear 40 does not rotate while the zoom lens 11 is extended or retracted between the retracted position and a position immediately behind the wide-angle extremity, the viewfinder drive gear 40 rotates only when the zoom lens 11 is driven to change its focal length between the wide-angle extremity and the telephoto extremity. Namely, the viewfinder drive gear 40 is driven only when the viewfinder drive gear 40 needs to be associated with the photographing optical system of the zoom lens 11.

Figure 19:
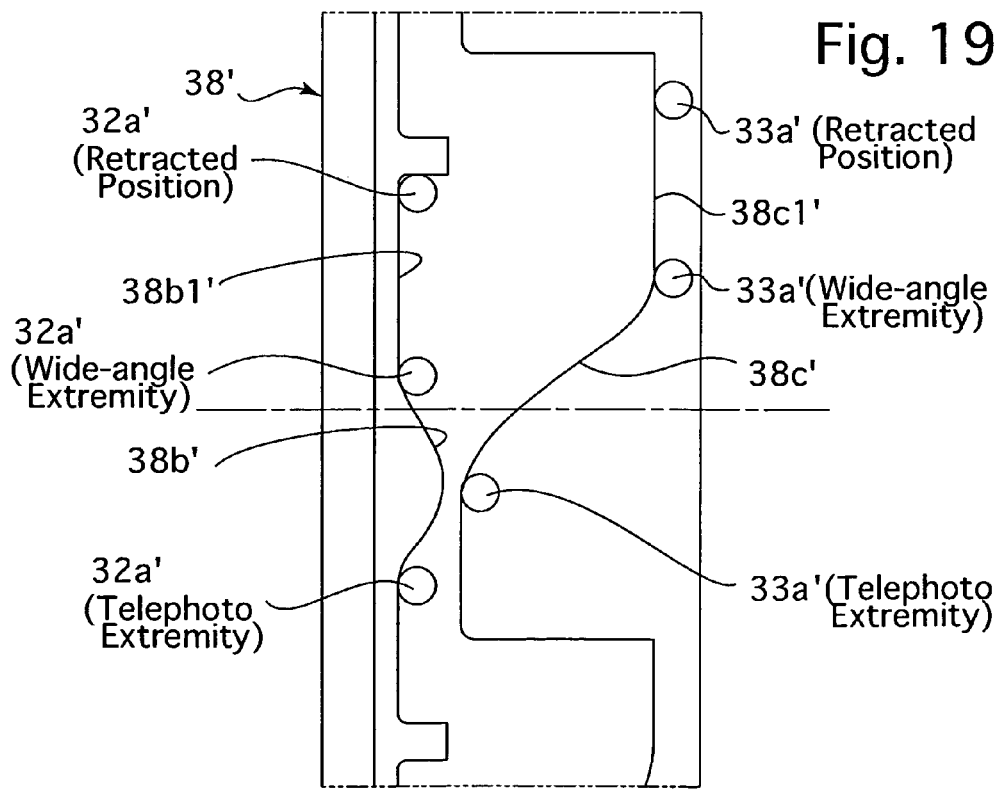
FIG. 19 is a view similar to that of FIG. 18, showing a conventional cam-incorporated gear including an idle running section which is to be compared with the cam-incorporated gear shown in FIG. 18.
Figure 20:
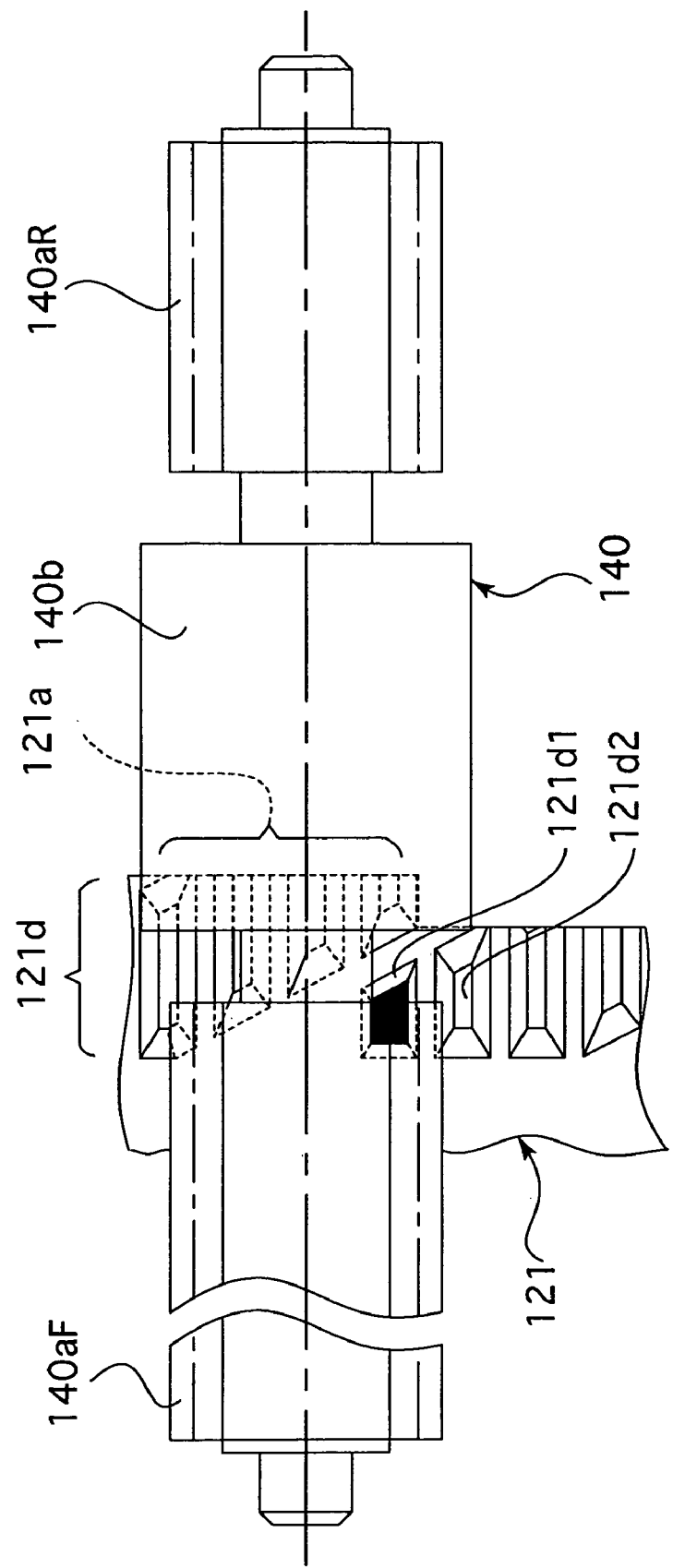
FIG. 20 is a developed view, partly omitted, of the viewfinder drive gear and the cam/helicoid ring of a second embodiment of the rotation transfer mechanism, showing a positional relationship between the viewfinder drive gear and the cam/helicoid ring in a state, which corresponds to the state shown in FIG. 11, where the viewfinder drive gear is prohibited from rotating in association with the cam/helicoid ring.
Figure 21:
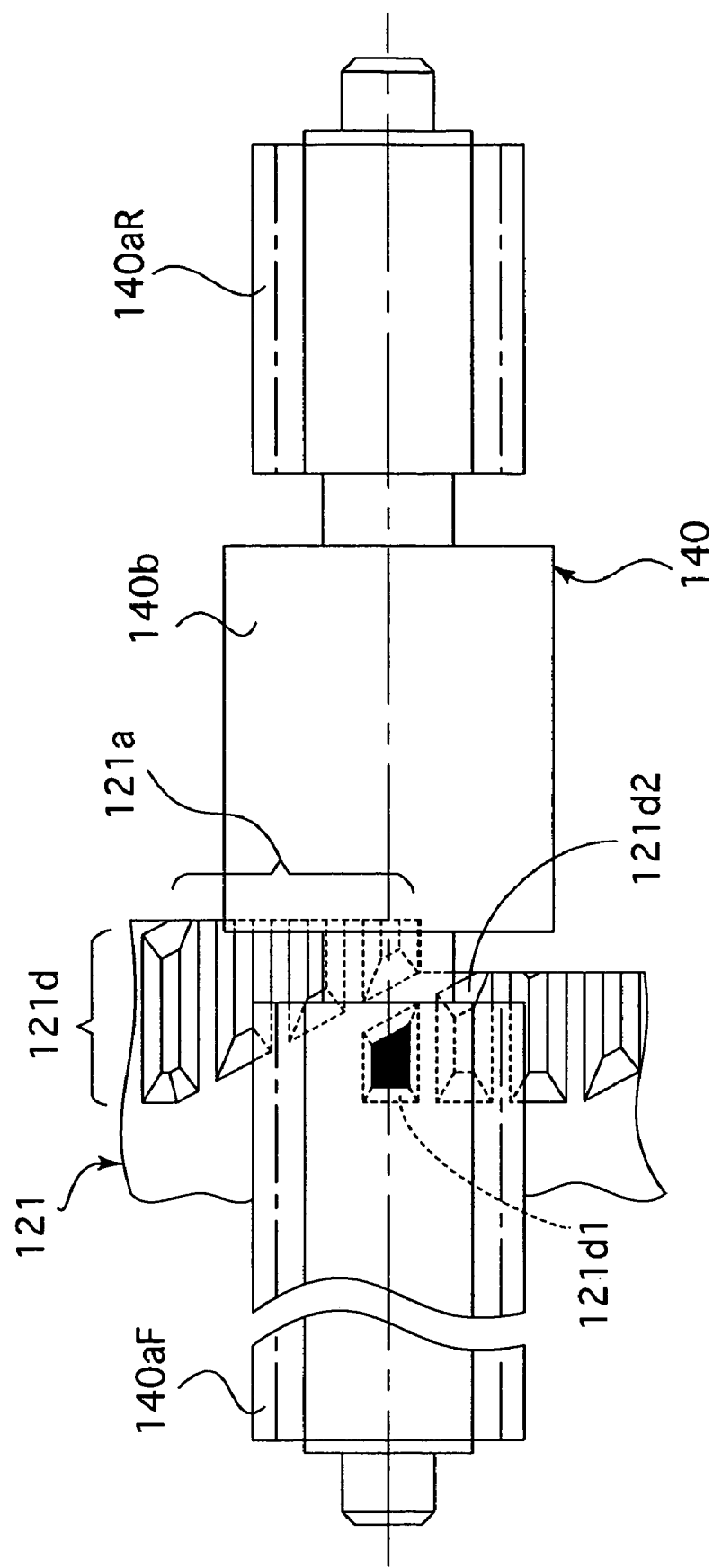
FIG. 21 is a view similar to that of FIG. 20, showing a state subsequent to the state shown in FIG. 20 wherein the viewfinder drive gear becomes rotatable in association with the cam/helicoid ring.

Unlike the present invention, if the viewfinder drive gear (40) were to rotate whenever the cam/helicoid ring 21 rotates, a drive transfer system extending from the viewfinder drive gear (40) to a movable lens of the zoom viewfinder would have to be provided with an idle running section for disengaging the movable lens from the viewfinder drive gear (40), because the viewfinder drive gear (40) rotates even when it is not necessary to drive the zoom viewfinder, i.e., when the zoom lens 11 is extended forward to the wide-angle extremity from the retracted state. FIG. 19 is a developed view, similar to that of FIG. 18, of an outer peripheral surface of a cam-incorporated gear 38' (which corresponds to the cam-incorporated gear 38 of the zoom lens 11) which is provided with such an idle running section. In each of FIGS. 18 and 19, the spur gear portion 38a is not shown for clarity. A first cam surface 38b' of the cam-incorporated gear 38', which corresponds to the first cam surface 38b of the cam-incorporated gear 38, is provided with a long linear surface 38b1' for preventing a follower pin 32a' (which corresponds to the follower pin 32a) from moving in the optical axis direction even if the cam-incorporated gear 38' rotates. Likewise, a second cam surface 38c' of the cam-incorporated gear 38', which correspond to the second cam surface 38c of the cam-incorporated gear 38, is provided with a long linear surface 38c1' for preventing a follower pin 33a' (which corresponds to the follower pin 33a) from moving in the optical axis direction even if the cam-incorporated gear 38' rotates. As can be understood by a comparison between FIGS. 18 and 19, the long linear surface 38b1' consumes a large circumferential range of the first cam surface 38b' to thereby shorten the remaining circumferential range of the first cam surface 38b' which is used as a cam surface for moving the follower pin 32a' in the optical axis direction; this inevitably increases the degree of inclination of the cam surface. Likewise, the long linear surface 38c1' consumes a large circumferential range of the second cam surface 38c' to thereby shorten the remaining circumferential range of the second cam surface 38c' which is used as a cam surface for moving the follower pin 33a' in the optical axis direction; this inevitably increases the degree of inclination of the cam surface. If the degree of inclination of each of the first cam surface 38b' and the second cam surface 38c' is great, the amount of movement of each follower pin 32' and 33' along the rotational axis of the cam-incorporated gear 38' (i.e., along the optical axis O) per unit of rotation of the cam-incorporated gear 38' becomes great, which makes it difficult to move each follower pin 32' and 33' with a high degree of positioning accuracy. If the degree of inclination of each of the first cam surface 38b' and the second cam surface 38c' is reduced to prevent this problem from occurring, the diameter of the cam-incorporated gear 38' has to be increased, which is detrimental to miniaturization of the zoom lens 11. This problem is also true for the case of adopting a cam plate instead of a cylindrical cam member such as the cam-incorporated gear 38.

In contrast, in the present embodiment of the zoom lens 11, in which the viewfinder drive gear 40 is not driven when not necessary to rotate, the cam-incorporated gear 38 does not have to be provided with any idle running section on each of the first and second cam surfaces 38b and 38c. Therefore, an effective circumferential range of a cam surface for moving the follower pin 32a or 33a in the optical axis direction can be secured on each of the first and second cam-surfaces 38b and 38c without increasing either the degree of inclination of the cam surfaces or the diameter of the cam-incorporated gear 38. In other words, miniaturizing the drive system for the zoom viewfinder and driving the movable lenses of the viewfinder optical system with high accuracy can be both achieved. In the present embodiment of the zoom lens 11, the first and second cam surfaces 38b and 38c of the cam-incorporated gear 38 are provided with linear surfaces 38b1 and 38c1 which look like the aforementioned linear surfaces 38b1' and 38c1', respectively, due to the fact that the spur gear 21d is brought into engagement with the spur gear portion 40a intentionally at the moment immediately before the zoom lens 11 (see FIGS. 12 and 16) reaches the zooming range (the wide-angle extremity) when the zoom lens 11 is extended forward from the retracted position in consideration of backlash and play among gears shown in FIGS. 6 through 8. Nevertheless, the circumferential lengths of the linear surfaces 38b1 and 38c1 are much smaller than those of the linear surfaces 38b1' and 38c1' of the comparative embodiment shown in FIG. 19.

One of a plurality of gear teeth of the spur gear 21d, i.e., a short gear tooth 21d1, is formed to have a shorter tooth depth than those of other normal gear teeth 21d2 of the spur gear 21d. The effect of the short gear tooth 21d1 will be discussed hereinafter.

FIGS. 11 and 15 show a state immediately before rotation of the cam/helicoid ring 21 starts being transferred to the viewfinder drive gear 40 via the spur gear 21d as described above. As shown in FIGS. 11 and 15, among the plurality of gear teeth of the spur gear 21d, the gear tooth of the spur gear 21d which first approaches the spur gear portion 40a of the viewfinder drive gear 40 is the short gear tooth 21d1. However, the short gear tooth 21d1 is not yet engaged with the spur gear portion 40a in the state shown in FIGS. 11 and 15. The normal gear teeth 21d2 are positioned farther from the spur gear portion 40a than the short gear tooth 21d1, and therefore are not yet engaged with the spur gear portion 40a either. No gear teeth serving as gear teeth of the spur gear 21d is formed on a specific portion of the outer peripheral surface of the cam/helicoid ring 21; the specific portion is right next to the short gear tooth 21d1 on one of the opposite sides thereof in the circumferential direction of the cam/helicoid ring 21 (the specific portion is located immediately above the short gear tooth 21d1 as viewed in FIG. 11). Accordingly, at the stage shown in FIGS. 11 and 15, the spur gear 21d is not yet engaged with the spur gear portion 40a, so that rotation of the cam/helicoid ring 21 is not yet transferred to the viewfinder drive gear 40. In this connection, at the stage shown in FIGS. 11 and 15, a part of the spur gear 21d still faces the flat surface portion 40b2 to prohibit the viewfinder drive gear 40 from rotating.

Further rotation of the cam/helicoid ring 21 in the lens barrel advancing direction causes the short gear tooth 21d1 to reach a position shown in FIG. 12. At this stage shown in FIG. 12, the short gear tooth 21d1 comes into contact with one tooth 40a1 of the teeth of the spur gear portion 40a and subsequently presses the tooth 40a1 in the lens barrel advancing direction (upwards as viewed in FIG. 12) to start rotating the viewfinder drive gear 40.

Further rotation of the cam/helicoid ring 21 in the lens barrel advancing direction causes a gear tooth of the normal gear teeth 21d2, which is adjacent to the short gear tooth 21d1 on one of the opposite sides thereof in the circumferential direction of the cam/helicoid ring 21, to press a subsequent gear tooth 40a2 of the spur gear portion 40a to keep rotating the viewfinder drive gear 40 (see FIG. 17). Thereafter, the spur gear 21d imparts a further rotation of the cam/helicoid ring 21 to the viewfinder drive gear 40 via the engagement of the normal gear teeth 21d2 with the gear teeth of the spur gear portion 40a. At the stage shown in FIG. 13 at which the cam/helicoid ring 21 reaches the position thereof at the wide-angle extremity, the short gear tooth 21d1 has already passed the point of engagement with the spur gear portion 40a, and the short gear tooth 21d1 is not used for the subsequent rotation of the cam/helicoid ring 21 in the zooming range between the wide-angle extremity and the telephoto extremity.

Accordingly, in the present embodiment of the zoom lens 11, an initial engagement portion of the spur gear 21d, which is first engaged with the spur gear portion 40a of the viewfinder drive gear 40, is formed as at least one short gear tooth (21d1), the tooth depth of which is smaller than those of the other gear teeth of the spur gear 21d. According to this construction, the spur gear 21d can be reliably and securely engaged with the spur gear portion 40a upon commencement of engagement therewith. Namely, if a normal gear tooth were to be firstly engaged with the spur gear portion 40a, since the tips of the mutually engaging tall gear teeth (of the spur gear 21d and the spur gear portion 40a) have a large relative rotational-angle, the engagement thereof is shallow (the initial engagement range is also short in the optical axis direction) so that there is a chance of engagement therebetween failing (miss engagement). Whereas, in the present invention, since the short gear tooth 21d1 moves and does not engage with the spur gear portion 40a until the relative rotational-angle between the short gear tooth 21d1 and the tall gear teeth of the spur gear portion 40a is very small, a deeper engagement is achieved (the initial engagement range is also long in the optical axis direction), so that there is no chance of engagement therebetween failing (miss engagement). Furthermore, this structure having the short gear tooth 21d1 reduces shock from the movement of engagement of the spur gear 21d with the spur gear portion 40a, thus making it possible to smoothly start operations of the zoom viewfinder drive system including the viewfinder drive gear 40 and to reduce the noise produced by the zoom viewfinder drive system.

Although the above descriptions have been directed mainly to the features found in operations of the zoom lens 11 when the zoom lens 11 advances from the retracted position toward the zooming range, similar features can reliably be expected in operations of the zoom lens 11 when the zoom lens 11 retracts to the retracted position.

FIGS. 20 through 25 show a second embodiment of the rotation transfer mechanism of the zoom camera 10. This embodiment is characterized in that a viewfinder drive gear 140 (which corresponds to the viewfinder drive gear 40) is provided with a semi-cylindrical portion 140b (which corresponds to the semi-cylindrical portion 40b) and two gear portions: a front gear portion 140aF and a rear gear portion 140aR which are positioned on the opposite sides of the semi-cylindrical portion 140b in a direction of the rotational axis of the viewfinder drive gear 140 (the horizontal direction as viewed in FIG. 20). Each of the front gear portion 140aF and the rear gear portion 140aR is formed to have a longer length than a spur gear 121d of a cam/helicoid ring 121 (which corresponds to the spur gear 21d of the cam/helicoid ring 21) in a direction of the rotational axis of the viewfinder drive gear 140 to be capable of remaining engaged with the spur gear 121d even when the viewfinder drive gear 140 and the cam/helicoid ring 121 move relative to each other in a direction of the rotational axis of the viewfinder drive gear 140, so long as each of the viewfinder drive gear 140 and the cam/helicoid ring 121 moves within a predetermined moving range thereof (e.g., within a zooming range between the wide-angle extremity and the telephoto extremity). An incomplete cylindrical portion 140b1 and a flat surface portion 140b2 of the semi-cylindrical portion 140b have the same function as the incomplete cylindrical portion 40b1 and the flat surface portion 40b2 of the semi-cylindrical portion 40b of the previous embodiment of the zoom lens 11, respectively.

Similar to the cam/helicoid ring 21 in the previous embodiment of the zoom lens 11, the cam/helicoid ring 121 is of a type which moves in the optical axis direction while rotating throughout the entire moving range from the retracted position to the telephoto extremity. In addition, the shapes and the functions of a female helicoid 121a, a spur gear 121d, a short gear tooth 121d1 and normal gear teeth 121d2 which are formed on the cam/helicoid ring 121 are identical to those of the female helicoid 21a, the spur gear 21d, the short gear tooth 21d1 and the normal gear teeth 21d2 of the cam/helicoid ring 21 in the previous embodiment of the zoom lens 11, respectively.

Figure 22:
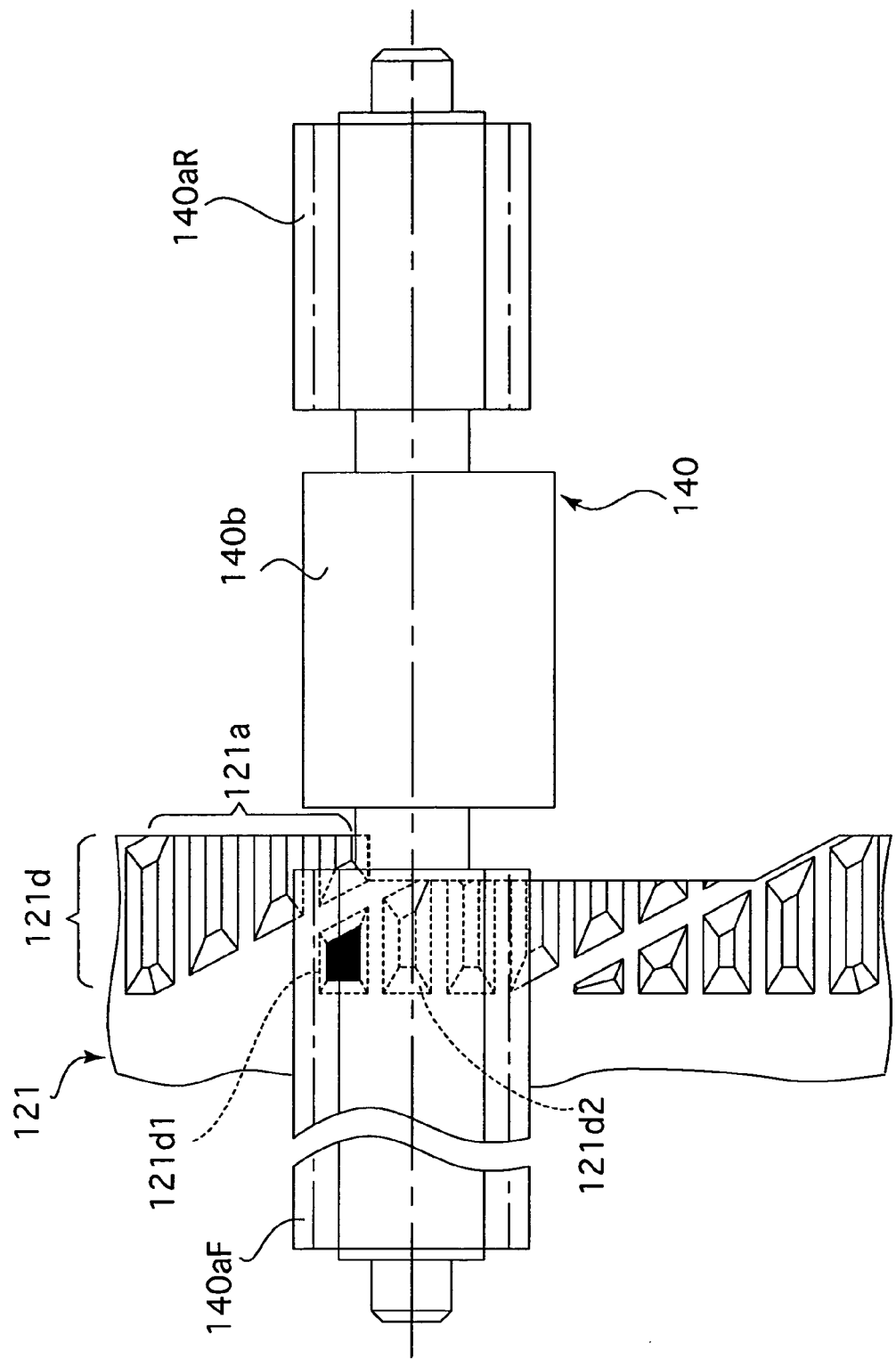
FIG. 22 is a view similar to that of FIG. 20, showing a state subsequent to the state shown in FIG. 21 wherein the viewfinder drive gear has been rotated by rotation of the cam/helicoid ring by a certain rotational angle.
Figure 23:
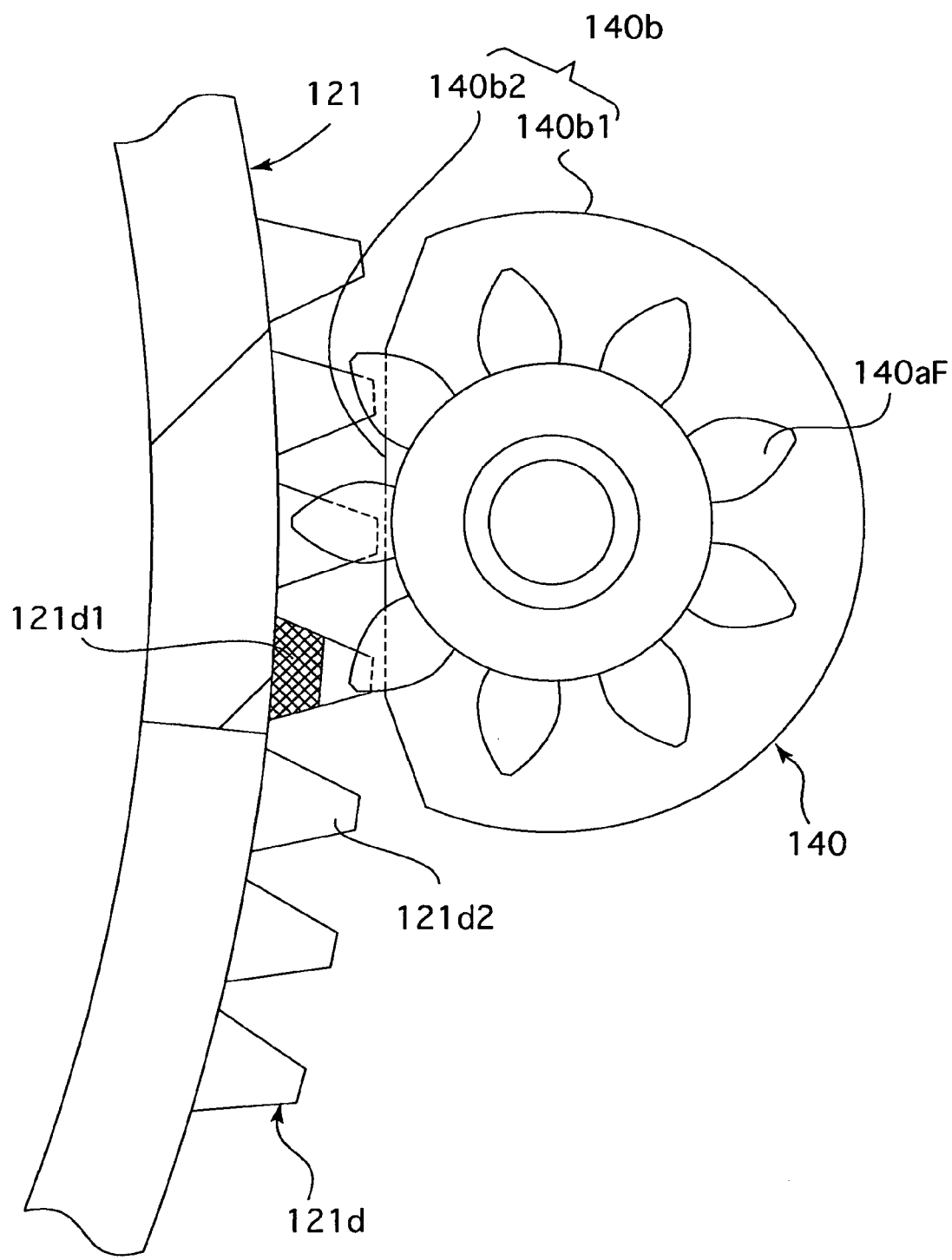
FIG. 23 is a front elevational view of the viewfinder drive gear and a portion of the helicoid ring which are shown in FIG. 20, showing an angular position of the viewfinder drive gear in the state shown in FIG. 20.
Figure 24:
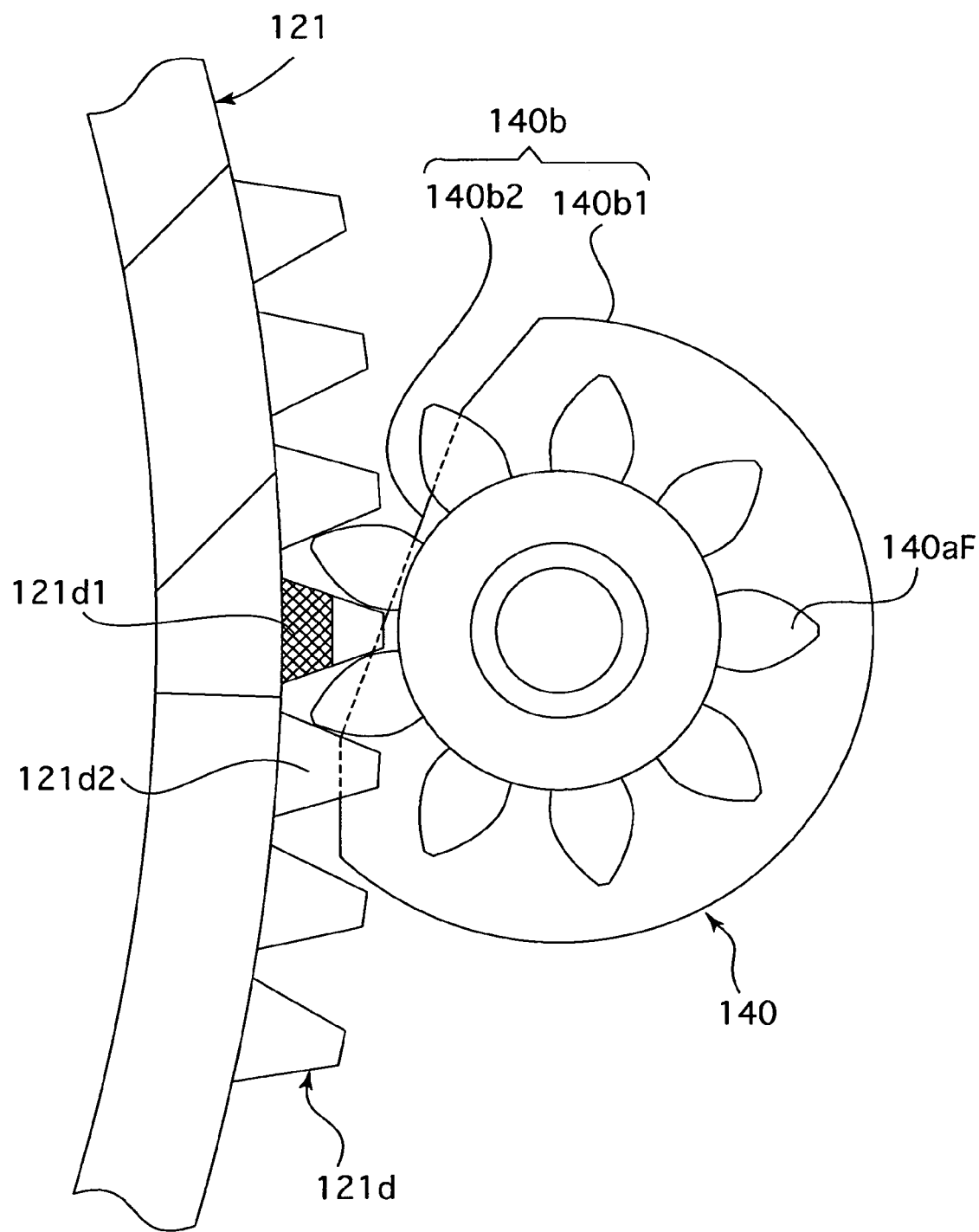
FIG. 24 is a front elevational view of the viewfinder drive gear and a portion of the helicoid ring which are shown in FIG. 21, showing an angular position of the viewfinder drive gear in the state shown in FIG. 21.
Figure 25:
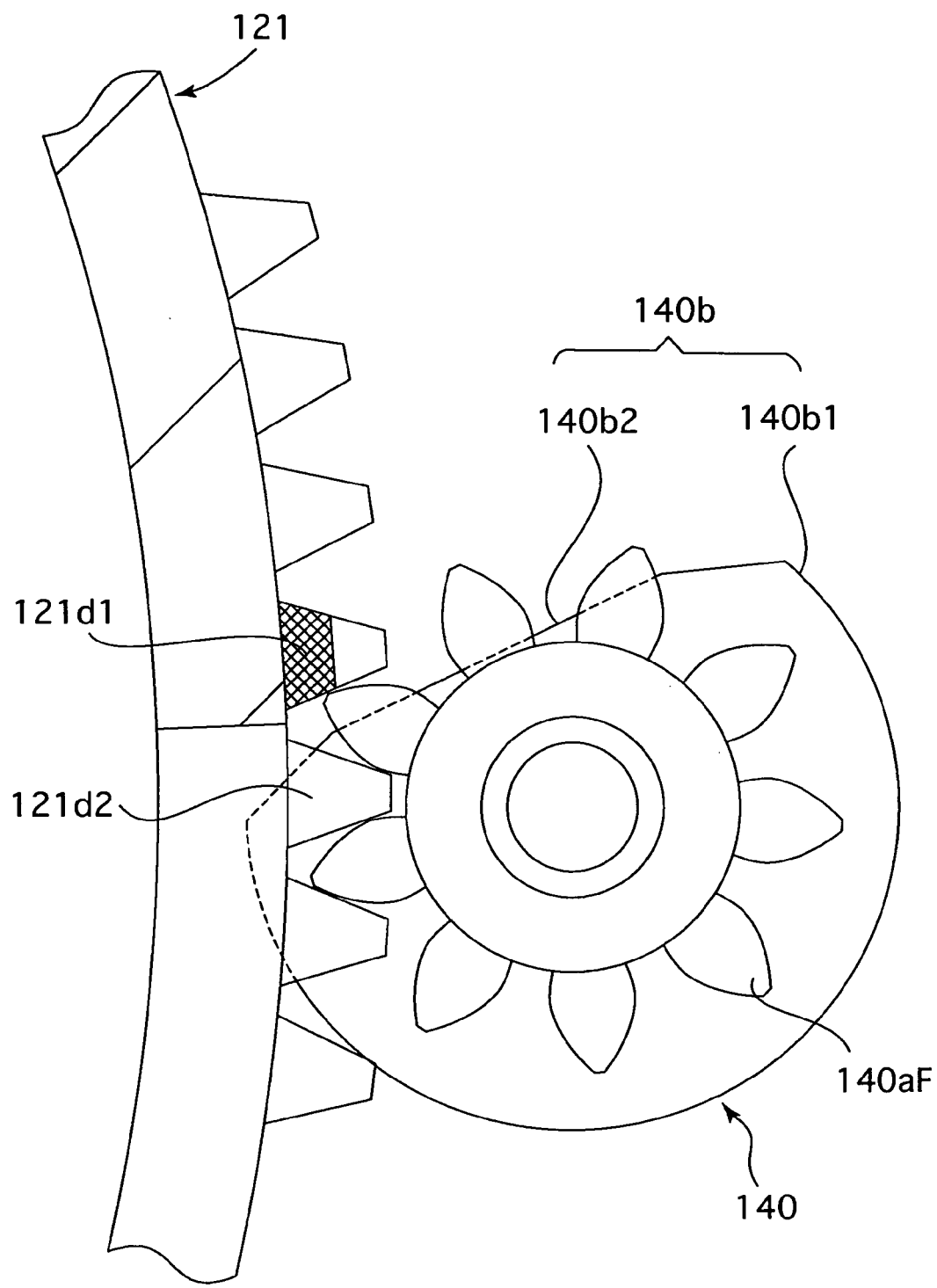
FIG. 25 is a front elevational view of the viewfinder drive gear and a portion of the helicoid ring which are shown in FIG. 22, showing an angular position of the viewfinder drive gear in the state shown in FIG. 22.

FIGS. 20 through 22 and 23 through 25 show variations in relative position over time between the cam/helicoid ring 21 and the viewfinder drive gear 140 which correspond to those show in FIGS. 11 through 13 and 15 through 17, respectively. Although detailed descriptions for the drawings shown in FIGS. 20 through 22 and 23 through 25 are omitted to eliminate redundancy of illustration, the viewfinder drive gear 140 is prohibited from rotating by the flat surface portion 140b2 in a state shown in FIGS. 20 and 23, and becomes capable of rotating by the engagement of the front gear portion 140aF with the spur gear 121d in a state shown in FIGS. 21 and 24. FIGS. 22 and 25 show a state where the viewfinder drive gear 140 has been rotated by a predetermined angle of rotation in associated with the cam/helicoid ring 121. Although not shown in the drawings, the front gear portion 140aF and the spur gear 121d remain engaged with each other even if the cam/helicoid ring 121 is extended to the position thereof at the telephoto extremity.

Additionally, in the second embodiment of the rotation transfer mechanism of the zoom camera 10, if the cam/helicoid ring 121 is moved rightward while rotating as viewed in FIG. 22 from the position shown in FIG. 22 by an amount of movement which is sufficient for the cam/helicoid ring 121 to move across the axial length of the semi-cylindrical portion 140b (the flat surface portion 140b2), the spur gear 121d of the cam/helicoid ring 121 is engaged with the rear gear portion 140aR of the viewfinder drive gear 140 so that the viewfinder drive gear 140 is again rotated in association with the cam/helicoid ring 121. Namely, the viewfinder drive gear 140 is rotated in association with the cam/helicoid ring 121 twice when the cam/helicoid ring 121 is moved in one axial direction from one end to the other in the moving range of the cam/helicoid ring 121 while rotating.

Figure 26:
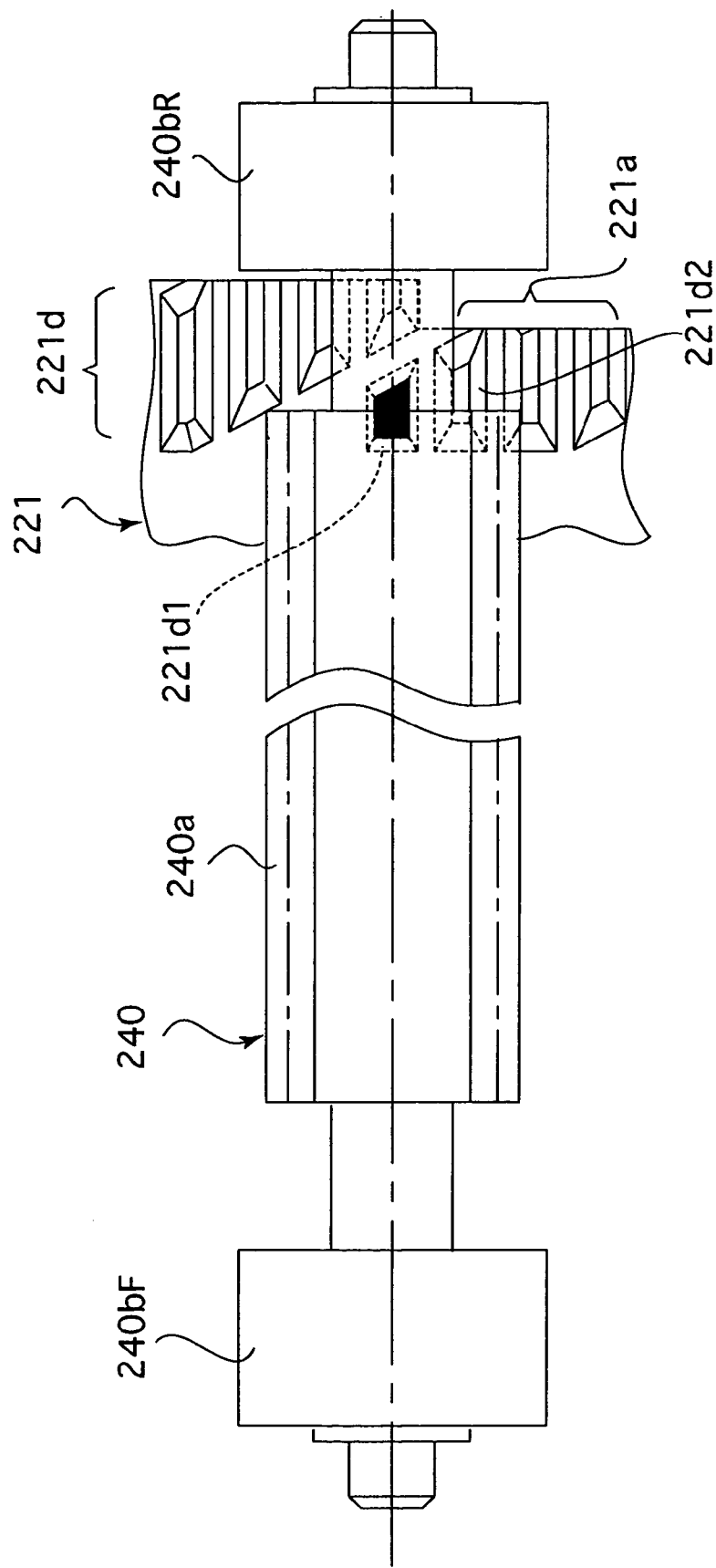
FIG. 26 is a developed view, partly omitted, of the viewfinder drive gear and the cam/helicoid ring of a third embodiment of the rotation transfer mechanism.
Figure 27:
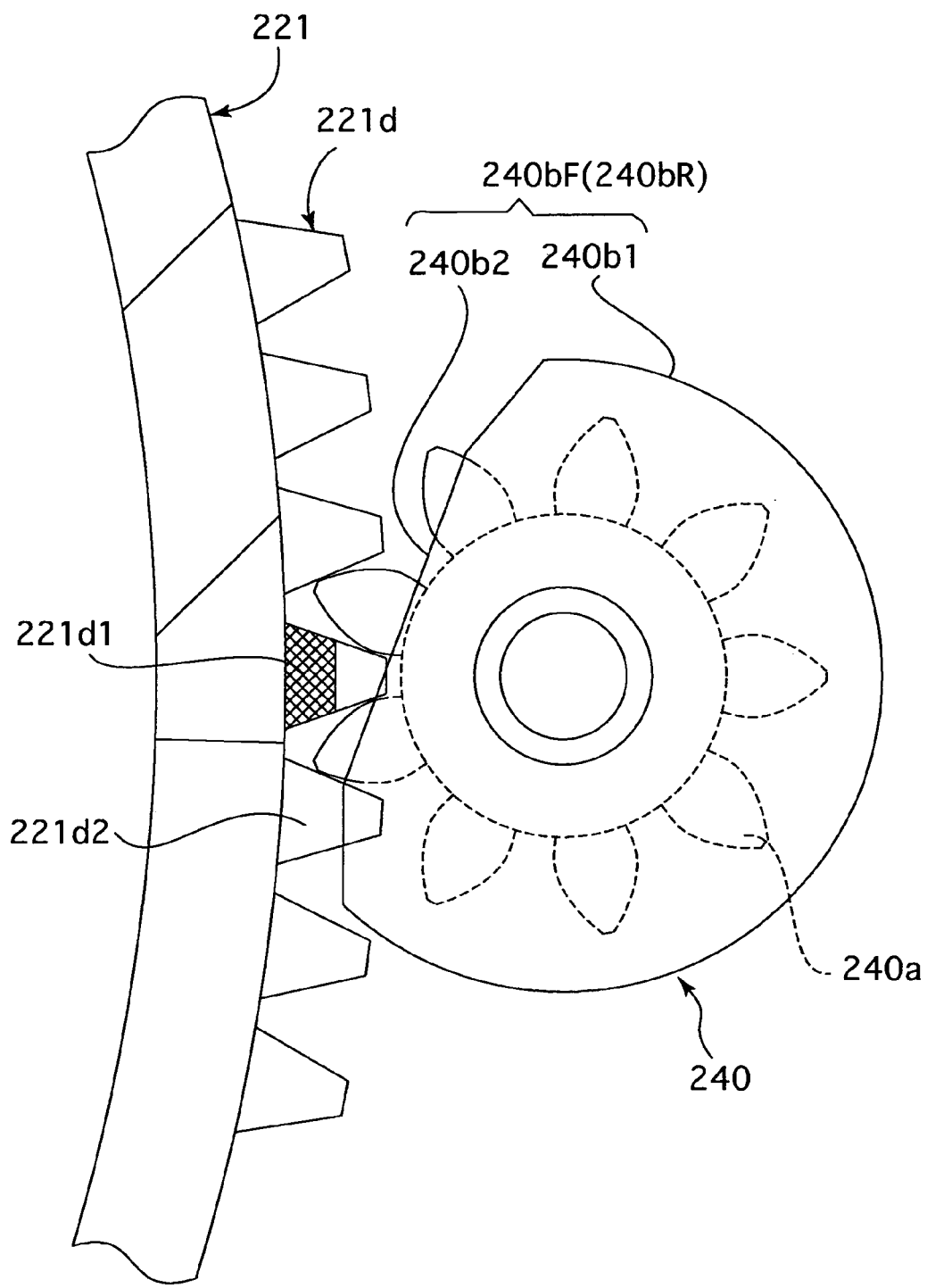
FIG. 27 is a front elevational view of the viewfinder drive gear and a portion of the helicoid ring which are shown in FIG. 26, showing an angular position of the viewfinder drive gear in the state shown in FIG. 26.

FIGS. 26 and 27 show a third embodiment of the rotation transfer mechanism of the zoom camera 10. In this embodiment, a viewfinder drive gear 240 (which corresponds to the viewfinder drive gear 40) is provided with a gear portion 240a and two semi-cylindrical portions: a front semi-cylindrical portion 240bF and a rear semi-cylindrical portion 240bR, in a reverse fashion compared to the second embodiment of the rotation transfer mechanism. The gear portion 240a is formed to have a longer length than a spur gear 221d of a cam/helicoid ring 221 (which corresponds to the spur gear 21d of the cam/helicoid ring 21) in a direction of the rotational axis of the viewfinder drive gear 240 to be capable of remaining engaged with the spur gear 221d even when the viewfinder drive gear 240 and the cam/helicoid ring 221 move relative to each other in a direction of the rotational axis of the viewfinder drive gear 240, so long as each of the viewfinder drive gear 240 and the cam/helicoid ring 221 moves within a predetermined moving range thereof (e.g., within a zooming range between the wide-angle extremity and the telephoto extremity). Similar to the semi-cylindrical portion 40b or 140b in the previous embodiments of the rotation transfer mechanisms, each of the front semi-cylindrical portion 240bF and the rear semi-cylindrical portion 240bR is provided with an incomplete cylindrical portion 240b1 and a flat surface portion 240b2 (which correspond to the incomplete cylindrical portion 40b1 and the flat surface portion 40b2 of the semi-cylindrical portion 40b of the previous embodiment of the zoom lens 11, respectively). Accordingly, the viewfinder drive gear 240 can be prohibited from rotating by the flat surface portion 240b2.

Similar to the cam/helicoid ring 21 or 121 in each of the previous two embodiments, the cam/helicoid ring 121 is of a type which moves in the optical axis direction while rotating throughout the entire moving range from the retracted position to the telephoto extremity. In addition, the shapes and the functions of a female helicoid 221a, a spur gear 221d, a short gear tooth 221d1 and normal gear teeth 221d2 which are formed on the cam/helicoid ring 221 are identical to those of the female helicoid 21a (121a), the spur gear 21d (121d), the short gear tooth 21d1 (121d1) and the normal gear teeth 21d2 (121d2) of the cam/helicoid ring 21 or 121 in each of the previous two embodiments, respectively.

The viewfinder drive gear 240 is suitable for a zoom lens which is in an assembling/disassembling state when the zoom lens is extended beyond its zooming range (beyond its position at telephoto extremity). Namely, different roles can be allocated to the front semi-cylindrical portion 240bF and the rear semi-cylindrical portion 240bR in a manner such that the rear semi-cylindrical portion 240bR prohibits the viewfinder drive gear 240 from rotating in its axial moving range from the retracted position to the zooming range (wide-angle extremity) in a manner similar to the semi-cylindrical portion 40b in the first embodiment of the rotation transfer mechanism, and that the front semi-cylindrical portion 240bF prohibits the viewfinder drive gear 240 from rotating when the zoom lens is disassembled.

As can be understood from the second and third embodiments of the rotation transfer mechanisms, a state where rotation is allowed to be transferred and another state where rotation is prohibited from being transferred can be freely changed by changing the number of gear portions of the rotation transfer gear (viewfinder drive gear) and the number of rotation limit portions (semi-cylindrical portions) and/or changing the arrangements of the same gear portions and the same rotation limit portions. Although the rotation transfer gear (viewfinder drive gear) is provided with two gear portions (140aF and 140aR) and one rotation limit portion (140b) in the second embodiment of the rotation transfer mechanism while the rotation transfer gear (viewfinder drive gear) is provided with one gear portion (240a) and two rotation limit portions (240bF and 240bR) in the third embodiment of the rotation transfer mechanism, it is possible to provide the rotation transfer gear (viewfinder drive gear) with at least two gear portions and at least two rotation limit portions. In this case, the gear portions and the rotation limit portions only need to be arranged alternately in the direction of the rotational axis of the rotation transfer gear.

The present invention is not limited solely to the particular embodiment described above. For instance, although the zoom viewfinder is made to be associated with the photographing optical system in the above illustrated embodiment of the zoom lens 11, a zoom flash which changes a flash coverage thereof in accordance with variation in focal length of the photographing optical system, instead of the zoom viewfinder, can be made to be associated with the photographing optical system.

The present invention can be applied not only to a rotation transfer mechanism incorporated in a zoom camera but also to a rotation transfer mechanism incorporated in any other device as long as the rotation transfer mechanism is of a type in which rotation of the rotatable ring is transferred to the driven member only when the rotatable ring is positioned in a predetermined range of rotation thereof relative to the driven member.

Although the viewfinder drive gear 40, 140 or 240 is prohibited from rotating by the flat surface portion 40b2, 140b2 or 240b2 of the semi-cylindrical portion (rotation limit portion) 40b, 140b or 240b in each of the above illustrated embodiments of the rotation transfer mechanisms, the shape of a portion of the rotation limit portion by which the viewfinder drive gear 40 is prohibited from rotating is not limited solely to a flat shape but can be any other shape.

The rotation transfer mechanism provided between a rotatable ring (the cam/helicoid ring 21, 121 or 221) and one or more driven members (the first movable frame 32 and/or the second movable frame 33) can have a structure different from that of the above described rotation transfer mechanism provided between the cam/helicoid ring 21, 121 or 221 and the first and second movable frames 32 and 33. For instance, in the case where the driven member(s) move linearly, the cam-incorporated gear 38 used in the above illustrated embodiment of the zoom lens 11 can be replaced by a cam plate which moves on a plane by a rack-and-pinion mechanism to convert a torque of the rotatable ring into a linear movement of the driven member.

The manner of driving the driven member is not limited solely to the aforementioned manner of driving the driven member, by which the driven member moves linearly. For instance, the driven member can be a rotatable member.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A rotation transfer mechanism comprising:
    a rotatable ring which is configured to rotate about a first rotational axis and has a circumferential gear formed on a peripheral surface of said rotatable ring;
    a rotation transfer gear shaft which is configured to rotate about a second rotational axis which is parallel to said first rotational axis, said rotatable ring and said rotation transfer gear shaft relatively moving in said first rotational axis direction while rotating;
    a gear portion which is provided on said rotation transfer gear shaft and is engageable with said circumferential gear to transfer said rotation of said rotatable ring to said rotation transfer gear shaft, wherein an axial length of said gear portion is longer than an axial length of said circumferential gear so that the engagement between said gear portion and said circumferential gear is maintained while said rotatable ring and said rotation transfer gear shaft move relative to each other throughout the entire relative movement range of said rotatable ring and said rotation transfer gear shaft; and
    a rotation limit portion provided on said rotation transfer gear shaft, said rotation limit portion having a non-circular cross section which is engageable with an outer edge of said circumferential gear to prohibit said rotation transfer gear shaft from rotating, said gear portion and said rotation limit portion being located at different axial positions on said rotation transfer gear shaft along said second rotational axis.

2. The rotation transfer mechanism according to claim 1, wherein said axial length of said rotation limit portion is shorter than said axial length of said gear portion.

3. The rotation transfer mechanism according to claim 1, wherein said rotatable ring is movable along said first rotational axis, and
    wherein said rotation transfer gear shaft is immovable along said second rotational axis.

4. The rotation transfer mechanism according to claim 1, wherein said rotatable ring comprises a helicoid located on a peripheral surface of said rotatable ring on which said circumferential gear is located.

5. The rotation transfer mechanism according to claim 4, wherein said helicoid is formed on an outer peripheral surface of said rotatable ring to serve as a male helicoid, and
    wherein said circumferential gear is formed on threads of said male helicoid so that each tooth of said circumferential gear extends in a direction parallel to both said first rotational axis and said second rotational axis.

6. The rotation transfer mechanism according to claim 1, wherein said rotation limit portion comprises a flat surface portion including a straight line parallel to said second rotational axis of said rotation transfer gear shaft.

7. The rotation transfer mechanism according to claim 1, wherein at least one of said gear portion and said rotation limit portion of said rotation transfer gear shaft comprises at least two portions located at different positions on said rotation transfer gear shaft in a direction of said second rotational axis.

8. The rotation transfer mechanism according to claim 1, further comprising:
    at least one driven member which is drivable by a rotation of said rotation transfer gear shaft, and is linearly guided in a direction parallel to said second rotational axis; and
    a driving-direction converter configured to convert torque transferred from said rotation transfer gear shaft into linear movement of said driven member.

9. The rotation transfer mechanism according to claim 8, wherein said driving-direction converter comprises a cam-incorporated rotatable cylinder having a substantially cylindrical shape which is rotatable on a rotational axis extending parallel to said second rotational axis in accordance with said rotation of said rotation transfer gear shaft, at least one cam surface being formed on an outer peripheral surface of said cam-incorporated rotatable cylinder.

10. The rotation transfer mechanism according to claim 8, further comprising a reduction gear train including a plurality of spur gears provided between said rotation transfer gear shaft and said driven member.

11. The rotation transfer mechanism according to claim 8, wherein said driven member comprises at least two driven members which are both movable relative to each other while changing the distance therebetween when said rotation transfer gear shaft is rotated.

12. The rotation transfer mechanism according to claim 1, wherein said circumferential gear of said rotatable ring comprises a reduced gear-tooth which is first engaged with said gear portion of said rotation transfer gear shaft when said rotatable ring changes from a first state in which said circumferential gear faces said rotation limit portion of said rotation transfer gear shaft to a second state in which said circumferential gear commences engagement with said gear portion of said rotation transfer gear shaft, a tooth depth of said reduced gear-tooth being smaller than those of other gear teeth of said gear portion of said rotation transfer gear shaft.

13. The rotation transfer mechanism according to claim 1, wherein said rotation transfer mechanism is incorporated in a camera having a zoom lens, and
    wherein said zoom lens comprises an imaging optical system including a plurality of movable optical elements which move along an optical axis of said imaging optical system by a rotation of said rotatable ring.

14. The rotation transfer mechanism according to claim 13, wherein said camera comprises a zoom viewfinder associated with said imaging optical system, and wherein at least one optical element of said zoom finder is moved in a direction parallel to said second rotational axis by a rotation of said rotation transfer gear shaft.

15. The rotation transfer mechanism according to claim 13, wherein said camera comprises a zoom flash associated with said imaging optical system, and wherein at least one optical element of said zoom flash is moved in a direction parallel to said second rotational axis by a rotation of said rotation transfer gear shaft.

16. The rotation transfer mechanism according to claim 1, wherein said rotation limit portion has a substantially D-shaped cross section.

17. The rotation transfer mechanism according to claim 1, wherein when said rotation gear shaft and said rotatable ring rotate, said rotatable ring moves in said first rotational axis direction while said rotation transfer gear shaft does not.

18. A camera having a variable-focal-length imaging optical system and a driven optical system driven in association with a focal-length varying operation of said variable-focal-length imaging optical system, said variable-focal-length imaging optical system being changeable between an operating state in which said variable-focal-length imaging optical system performs said focal-length varying operation and a non-operating state in which said variable-focal-length imaging optical system retracts, said camera comprising:
    a rotatable drive ring including a circumferential gear on a peripheral surface of said rotatable drive ring, and configured to perform an advancing/retracting operation in which said rotatable drive ring moves along a first rotational axis while rotating thereabout during a focal-length varying operation of said variable-focal-length imaging optical system; and a drive gear shaft rotatable about a second rotational axis parallel to said first rotational axis, said driven optical system being driven by a rotation of said drive gear shaft wherein said drive gear shaft comprises:

a gear portion which is engaged with said circumferential gear to transfer said rotation of said rotatable drive ring to said drive gear shaft, an axial length of said gear portion being greater than an axial length of said circumferential gear; and a rotation limit portion having a non-circular cross section which is engageable with an outer edge of said circumferential gear to prohibit said drive gear shaft from rotating, said gear portion and said rotation limit portion being located at different axial positions on said drive gear shaft, wherein said drive gear shaft and said rotatable drive ring are positioned relative to each other such that said circumferential gear and said gear portion are engaged with each other when said rotatable drive ring is positioned in a first axial movement range thereof on said first rotational axis in which said rotatable drive ring makes said focal-length imaging optical system perform said focal-length varying operation, and wherein said drive gear shaft and said rotatable drive ring are positioned relative to each other such that said rotation limit portion faces said circumferential gear to be engageable with said outer edge of said circumferential gear when said rotatable drive ring is positioned in a second axial movement range thereof on said first rotation axis in which said rotatable drive ring makes said focal-length imaging optical system change between a ready-to-photograph state and a retracted state.

19. The camera according to claim 18, wherein said rotation limit portion comprises at least two rotation limit portions, wherein said gear portion comprises at least two gear portions, and wherein said two rotation limit portions and said two gear portions are alternately arranged along said second rotational axis.

20. The camera according to claim 18, wherein said first rotational axis and said second rotational axis are parallel to an optical axis of said variable-focal-length imaging optical system.

21. The camera according to claim 18, wherein said driven optical system comprises an optical system of a zoom viewfinder incorporated in said camera.

22. The camera according to claim 18, wherein said driven optical system comprises an optical system of a zoom flash incorporated in said camera.

23. The camera according to claim 18, wherein said circumferential gear of said rotatable drive ring comprises a reduced gear-tooth which is first engaged with said gear portion of said drive gear shaft when said rotatable drive ring changes from a first state in which said circumferential gear faces said rotation limit portion of said drive gear shaft to a second state in which said circumferential gear commences engagement with said gear portion of said drive gear, a tooth depth of said reduced gear-tooth being smaller than those of other gear teeth of said gear portion of said drive gear.

* * * * *